US011302317B2

(12) United States Patent
Saito et al.

(10) Patent No.: US 11,302,317 B2
(45) Date of Patent: Apr. 12, 2022

(54) INFORMATION PROCESSING APPARATUS AND INFORMATION PROCESSING METHOD TO ATTRACT INTEREST OF TARGETS USING VOICE UTTERANCE

(71) Applicant: SONY CORPORATION, Tokyo (JP)

(72) Inventors: Mari Saito, Kanagawa (JP); Hiro Iwase, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 16/487,456

(22) PCT Filed: Dec. 26, 2017

(86) PCT No.: PCT/JP2017/046505
§ 371 (c)(1),
(2) Date: Aug. 21, 2019

(87) PCT Pub. No.: WO2018/173405
PCT Pub. Date: Sep. 27, 2018

(65) Prior Publication Data
US 2020/0005786 A1      Jan. 2, 2020

(30) Foreign Application Priority Data

Mar. 24, 2017   (JP) .............................. JP2017-059447

(51) Int. Cl.
*G10L 15/22* (2006.01)
*G10L 15/18* (2013.01)
*G10L 25/63* (2013.01)

(52) U.S. Cl.
CPC .......... *G10L 15/22* (2013.01); *G10L 15/1815* (2013.01); *G10L 25/63* (2013.01); *G10L 2015/223* (2013.01); *G10L 2015/225* (2013.01)

(58) Field of Classification Search
CPC ................. G10L 15/1815; G10L 15/22; G10L 2015/223; G10L 2015/225; G10L 25/63
See application file for complete search history.

(56) References Cited

U.S. PATENT DOCUMENTS 10,210,885 B1 *   2/2019   Carlson .................. G06F 15/16
10,349,227 B2 *   7/2019   Saxena ................. H04W 4/023
(Continued)

FOREIGN PATENT DOCUMENTS

| JP | 2004-096171 A | 3/2004 |
| JP | 2010-128281 A | 6/2010 |
| WO | 2016136062 A1 | 9/2016 |

OTHER PUBLICATIONS

European Search Opinion for EP 17902153, dated Feb. 19, 2020 (Year: 2020).*

(Continued)

*Primary Examiner* — Eric Yen
(74) *Attorney, Agent, or Firm* — Chip Law Group

(57) ABSTRACT

Achieving voice utterance that can attract an interest of a target further effectively. There is provided an information processing apparatus that includes an utterance control unit that controls output of voice utterance. The utterance control unit determines a target on the basis of an analyzed context, and controls an output device to output an attracting utterance that attracts an interest of the target. Furthermore, there is provided an information processing method that includes executing, by a processor, output control of voice utterance. The execution of the output control further includes determining a target on the basis of an analyzed context and controlling an output device to output an attracting utterance that attracts an interest of the target.

20 Claims, 15 Drawing Sheets

(56) References Cited

U.S. PATENT DOCUMENTS

| | | | |
|---|---|---|---|
| 10,971,146 B2* | 4/2021 | Kobayashi | H04R 3/12 |
| 2002/0143525 A1* | 10/2002 | Lewis | G10L 15/26 |
| | | | 704/201 |
| 2004/0044516 A1* | 3/2004 | Kennewick | G10L 15/22 |
| | | | 704/5 |
| 2004/0083101 A1* | 4/2004 | Brown | G10L 15/1822 |
| | | | 704/235 |
| 2004/0102971 A1* | 5/2004 | Lipscher | G06F 40/35 |
| | | | 704/236 |
| 2004/0130449 A1* | 7/2004 | Hung | G10L 17/26 |
| | | | 340/573.1 |
| 2005/0060158 A1* | 3/2005 | Endo | G10L 15/22 |
| | | | 704/275 |
| 2005/0075875 A1* | 4/2005 | Shozakai | G06K 9/00335 |
| | | | 704/231 |
| 2005/0149853 A1* | 7/2005 | Naitou | G06F 16/9558 |
| | | | 715/206 |
| 2006/0106780 A1* | 5/2006 | Dagan | G06Q 10/107 |
| 2006/0109734 A1* | 5/2006 | Fukuda | G06Q 30/0641 |
| | | | 365/232 |
| 2007/0201636 A1* | 8/2007 | Gilbert | G06Q 30/0261 |
| | | | 379/88.14 |
| 2008/0111685 A1* | 5/2008 | Olson | G10L 21/00 |
| | | | 340/545.6 |
| 2008/0235031 A1* | 9/2008 | Yamamoto | G10L 15/26 |
| | | | 704/275 |
| 2009/0210089 A1* | 8/2009 | Christie | G07F 11/62 |
| | | | 700/244 |
| 2010/0114944 A1* | 5/2010 | Adler | G10L 15/22 |
| | | | 707/770 |
| 2011/0026690 A1* | 2/2011 | Garcia Gomar | H04M 3/53383 |
| | | | 379/88.16 |
| 2011/0195775 A1* | 8/2011 | Wells | G07F 17/3223 |
| | | | 463/29 |
| 2013/0006634 A1* | 1/2013 | Grokop | G10L 17/10 |
| | | | 704/245 |
| 2013/0088565 A1* | 4/2013 | Buckler | H04N 7/15 |
| | | | 348/14.08 |
| 2014/0038544 A1* | 2/2014 | Jones | G08B 13/196 |
| | | | 455/404.2 |
| 2015/0088515 A1* | 3/2015 | Beaumont | G10L 17/06 |
| | | | 704/251 |
| 2016/0042749 A1* | 2/2016 | Hirose | G10L 15/22 |
| | | | 704/270.1 |
| 2016/0133254 A1* | 5/2016 | Vogel | G06F 9/451 |
| | | | 704/275 |
| 2016/0259345 A1* | 9/2016 | McHale | G05D 1/0027 |
| 2016/0275546 A1* | 9/2016 | Kitagishi | G06Q 30/0244 |
| 2016/0353062 A1* | 12/2016 | Ono | G02B 27/0093 |
| 2017/0041556 A1* | 2/2017 | Aiba | H04N 7/147 |
| 2017/0083933 A1* | 3/2017 | Sakurai | G01C 21/3697 |
| 2017/0206243 A1* | 7/2017 | Ono | G06F 3/167 |
| 2017/0337921 A1* | 11/2017 | Aoyama | G10L 15/26 |
| 2017/0339721 A1 | 11/2017 | Mukherjee et al. | |
| 2018/0009118 A1* | 1/2018 | Yamaga | B25J 11/0005 |
| 2018/0063278 A1* | 3/2018 | Helled | G06F 3/0482 |
| 2018/0066927 A1* | 3/2018 | Wu | H04M 1/72415 |
| 2018/0233139 A1* | 8/2018 | Finkelstein | G06F 1/3231 |
| 2018/0233142 A1* | 8/2018 | Koishi | G01S 5/28 |
| 2019/0027142 A1* | 1/2019 | Iwanami | H04L 67/04 |
| 2019/0156295 A1* | 5/2019 | Lu | A61B 5/168 |
| 2019/0259388 A1* | 8/2019 | Carpenter, II | G06K 9/00335 |

OTHER PUBLICATIONS

Specification of U.S. Appl. No. 62/383,277, filed Sep. 2, 2016 (Year: 2016).*

International Search Report and Written Opinion of PCT Application No. PCT/JP2017/046505, dated Mar. 20, 2018, 09 pages of ISRWO.

Kihara, Tamio et al., A Composition Method of Situation Conformity Digital-signage Using Human Position and Movement. Transactions of the Information Processing Society of Japan, Feb. 15, 2012, vol. 53, No. 2, pp. 868-878. Translation of abstract only.

Nakazawa, Satoshi et al., A Virtual Space Agent for Advancing Dialogue. Multimedia, Distributed, Cooperative, and Mobile Symposium (DICOMO)), Jun. 28, 2000, vol. 2000, No. 7, pp. 19-24. Translation of abstract only.

Office Action for EP Patent Application No. 17902153.0, dated Oct. 7, 2021, 6 pages of Office Action.

Japanese Office Action issued in Japanese Application No. 2019-506948 dated Nov. 16, 2021, 11 pages.

* cited by examiner

FIG. 6
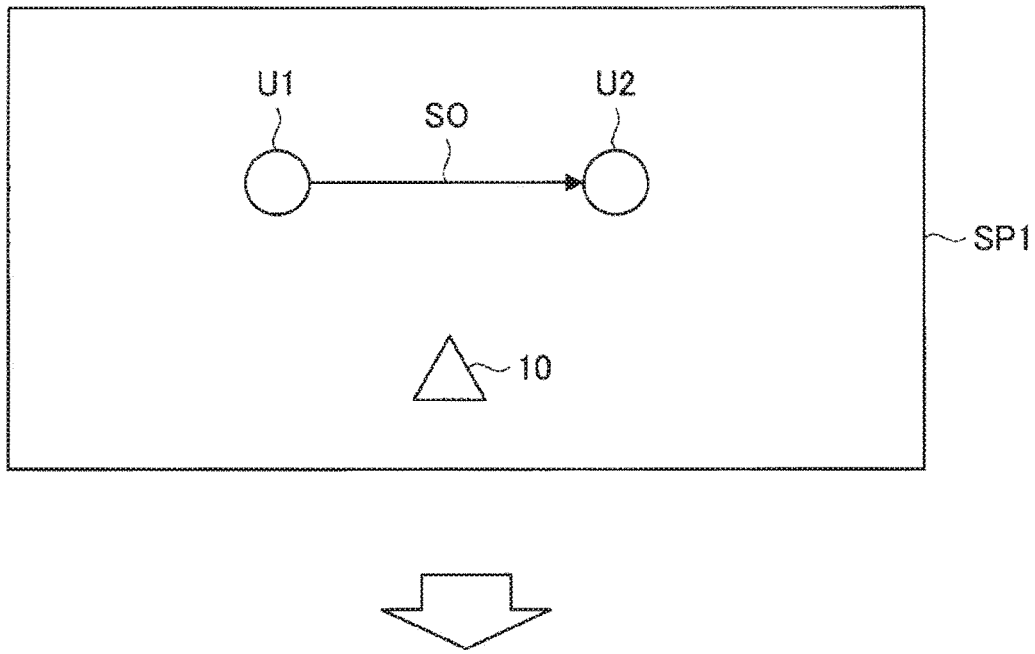
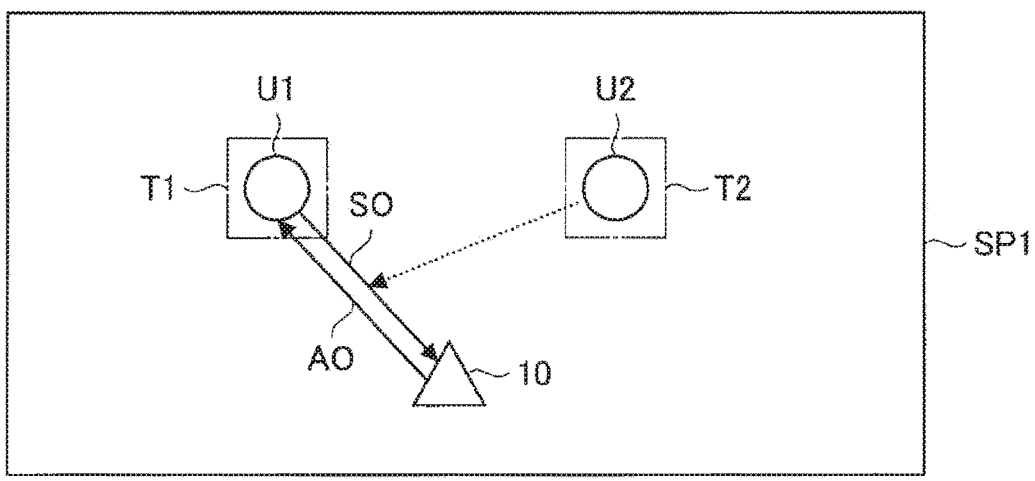

FIG. 7
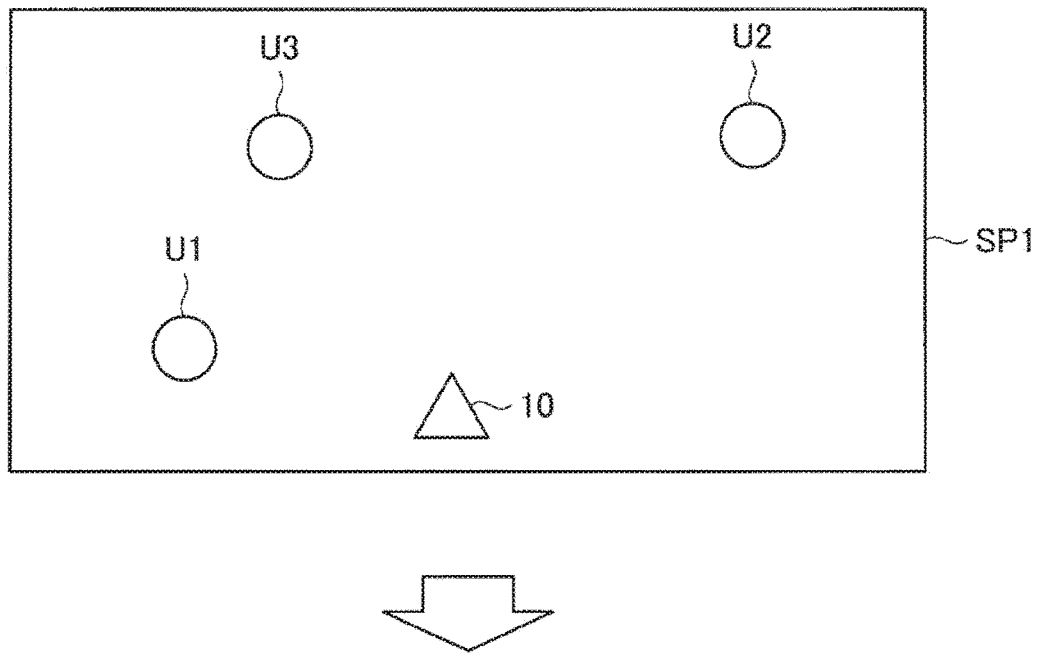
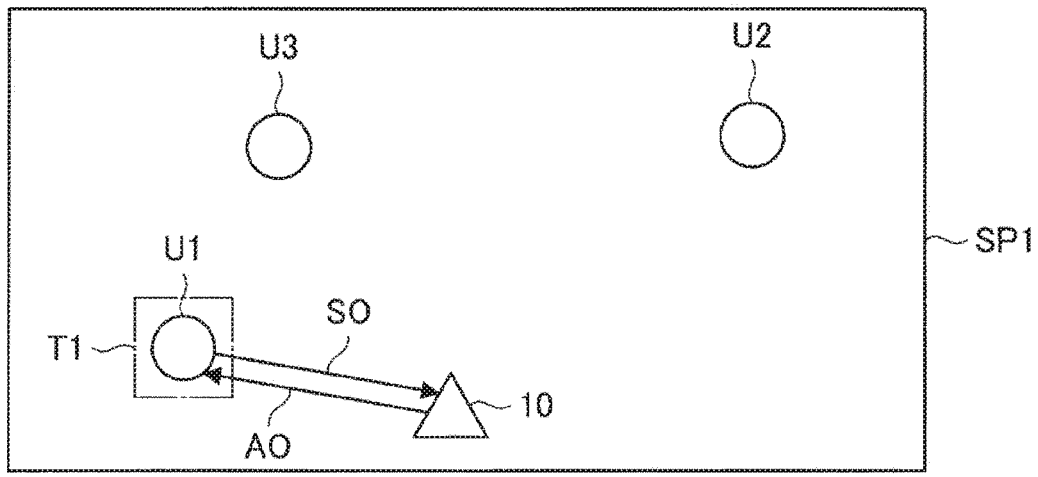

FIG. 9
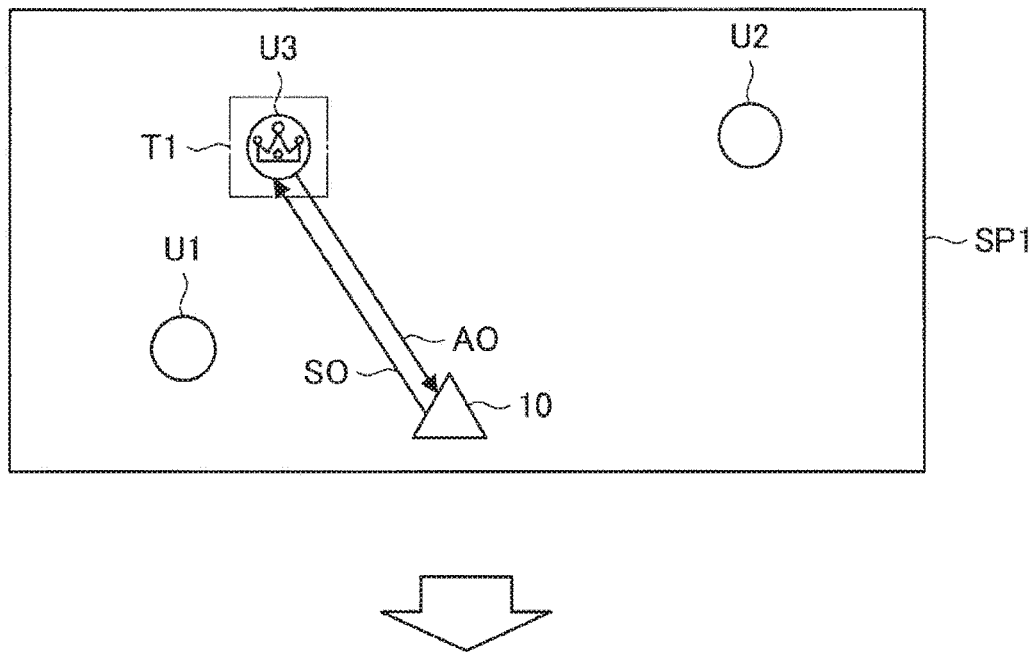
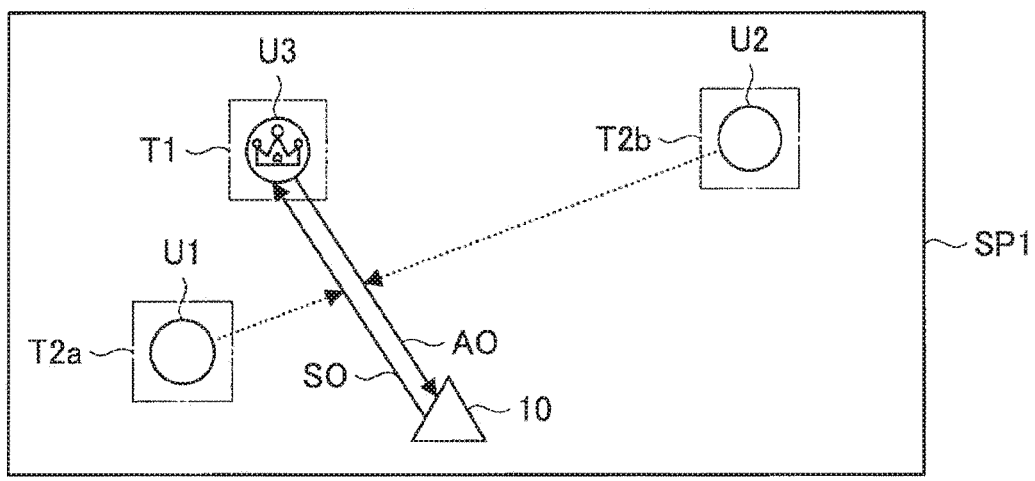

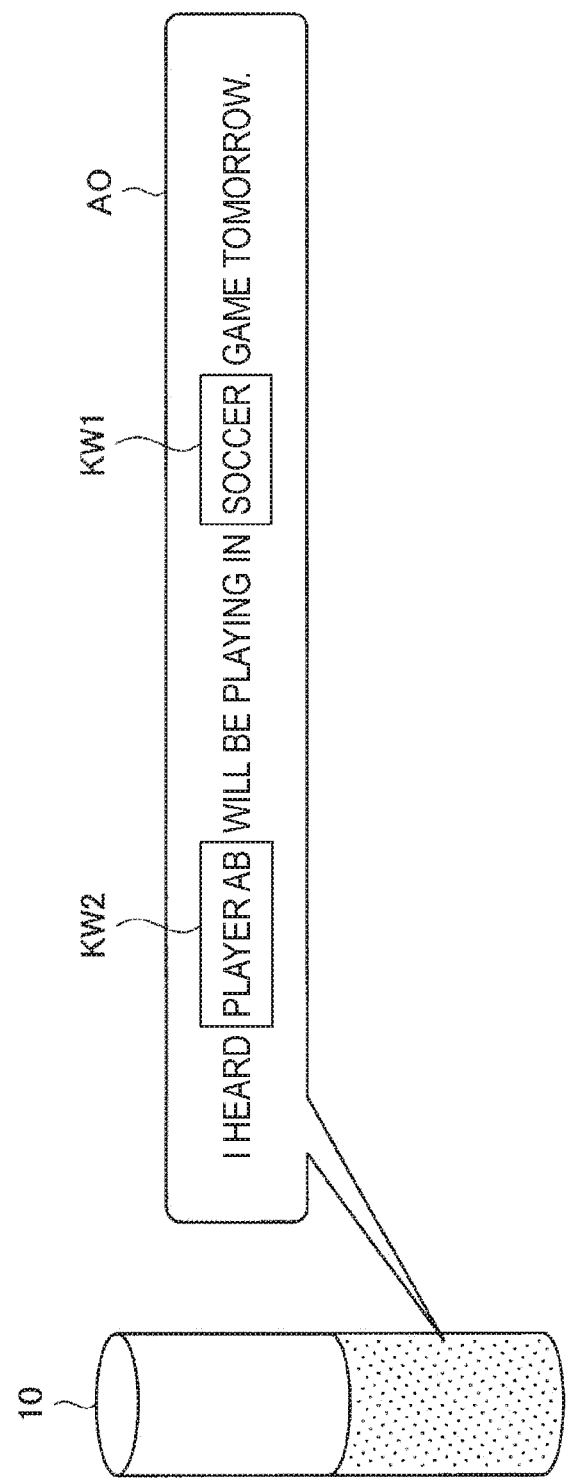

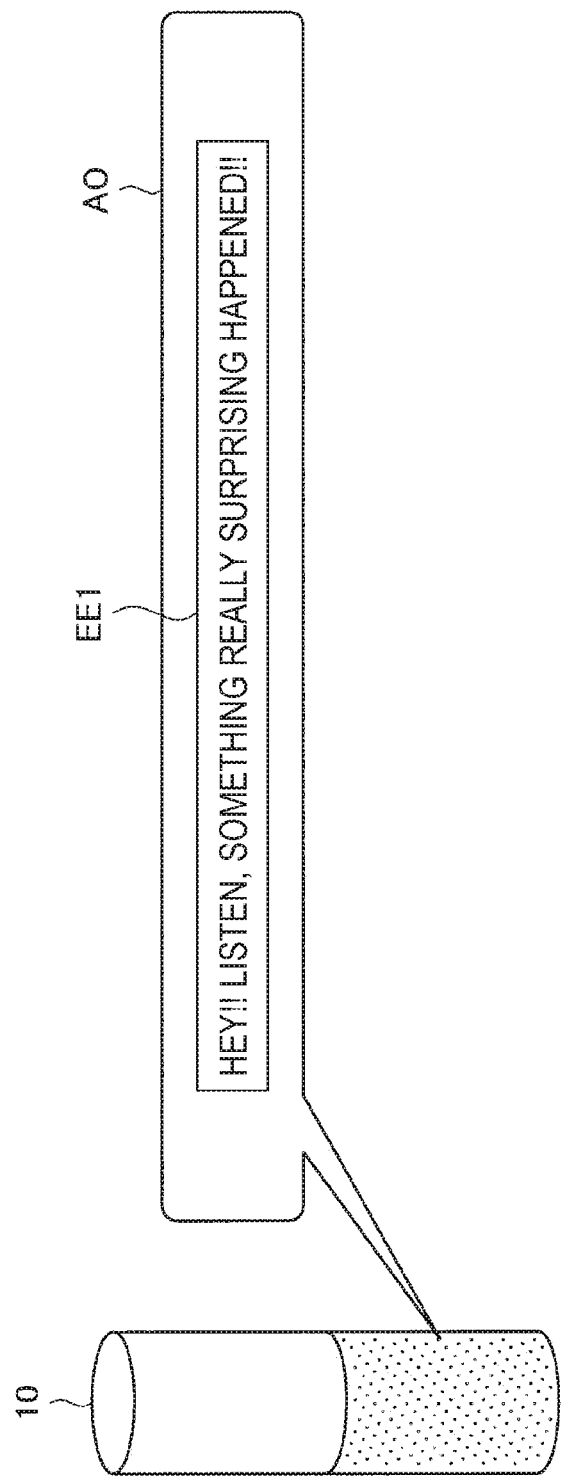

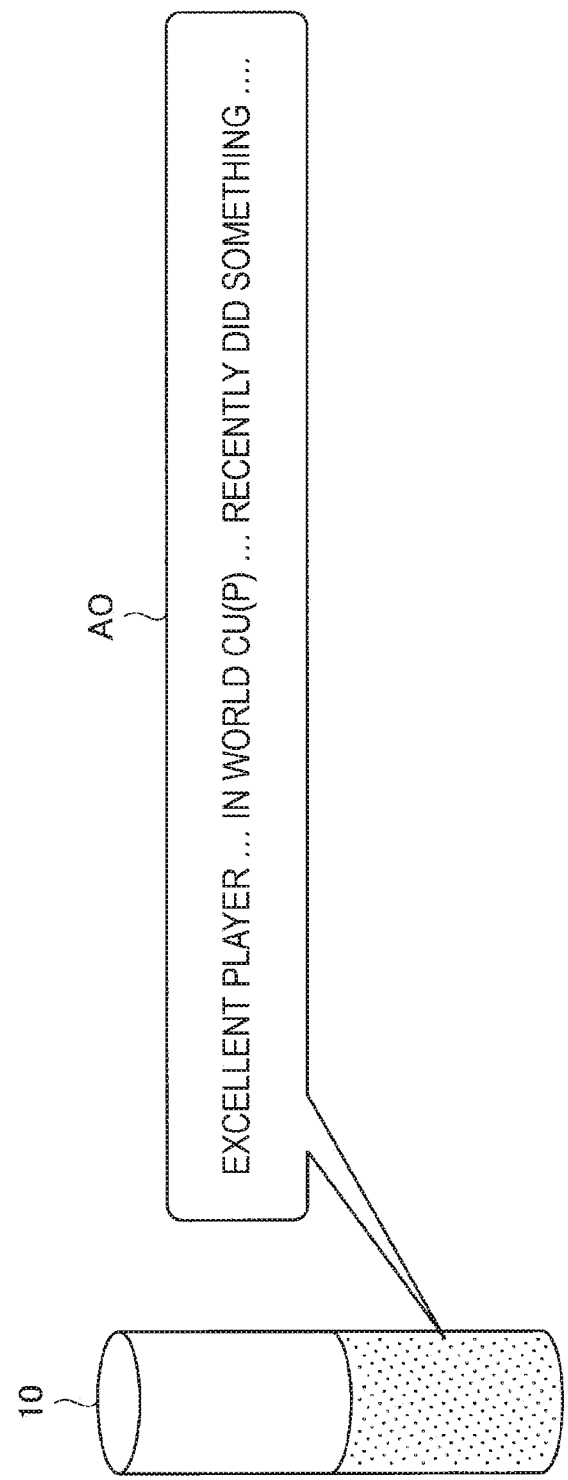

INFORMATION PROCESSING APPARATUS AND INFORMATION PROCESSING METHOD TO ATTRACT INTEREST OF TARGETS USING VOICE UTTERANCE

CROSS REFERENCE TO RELATED APPLICATIONS

This application is a U.S. National Phase of International Patent Application No. PCT/JP2017/046505 filed on Dec. 26, 2017, which claims priority benefit of Japanese Patent Application No. JP 2017-059447 filed in the Japan Patent Office on Mar. 24, 2017. Each of the above-referenced applications is hereby incorporated herein by reference in its entirety.

TECHNICAL FIELD

The present disclosure relates to an information processing apparatus and an information processing method.

BACKGROUND ART

In recent years, there have been widespread various agent devices that use voice to notify users of information. Furthermore, many technologies have been developed for performing output control in consideration of user's status and surrounding environment regarding information notification by the agent device as described above. For example, Patent Document 1 discloses an announcement system that notifies information at a volume according to an ambient noise level and thereby enables a user to effectively perceive the content of the notified information.

CITATION LIST

Patent Document

Patent Document 1: Japanese Patent Application National Publication (Laid-Open) No. 2009-517305

SUMMARY OF THE INVENTION

Problems to be Solved by the Invention

The technology described in Patent Document 1, however, merely controls the volume regarding the information notification on the basis of the ambient noise level. Therefore, it is estimated, in a case where the information notification is repeatedly performed, that the user adjusts to the volume and an effect of attracting user's attention would be gradually reduced.

To overcome this, the present disclosure proposes a novel and improved information processing apparatus and information processing method capable of achieving a voice utterance that attracts an interest of the target further effectively.

Solutions to Problems

According to the present disclosure, there is provided an information processing apparatus including an utterance control unit that controls output of voice utterance, in which the utterance control unit determines a target on the basis of an analyzed context and controls an output device to output an attracting utterance that attracts an interest of the target.

Furthermore, according to the present disclosure, there is provided an information processing method including executing, by a processor, output control of voice utterance, in which the execution of the output control further includes: determining a target on the basis of an analyzed context; and controlling an output device to output an attracting utterance that attracts an interest of the target.

Effects of the Invention

As described above, according to the present disclosure, it is possible to achieve voice utterance that attracts an interest of the target further effectively.

Note that the above-described effect is not necessarily limited, and it is also possible to use any one of the effects illustrated in this specification together with the above-described effect or in place of the above-described effect, or other effects that can be assumed from this specification.

BRIEF DESCRIPTION OF DRAWINGS

FIG. 6 is a view illustrating determination of a target based on a status in which a target user makes no response to an utterance by an uttering user according to a first embodiment of the present disclosure.

FIG. 7 is a view illustrating determination of a first target based on user position according to the same embodiment.

FIG. 9 is a view illustrating determination of the first target based on a user's matter of interest according to the same embodiment.

FIG. 10A is a view illustrating an example of an attracting utterance related to a matter of interest of the second target according to the same embodiment.

FIG. 10B is a view illustrating an example of an attracting utterance including emotional expression according to the same embodiment.

FIG. 10C is a view illustrating an example of an attracting utterance controlled so as to be partially less audible according to the same embodiment.

MODE FOR CARRYING OUT THE INVENTION

Figure 1:
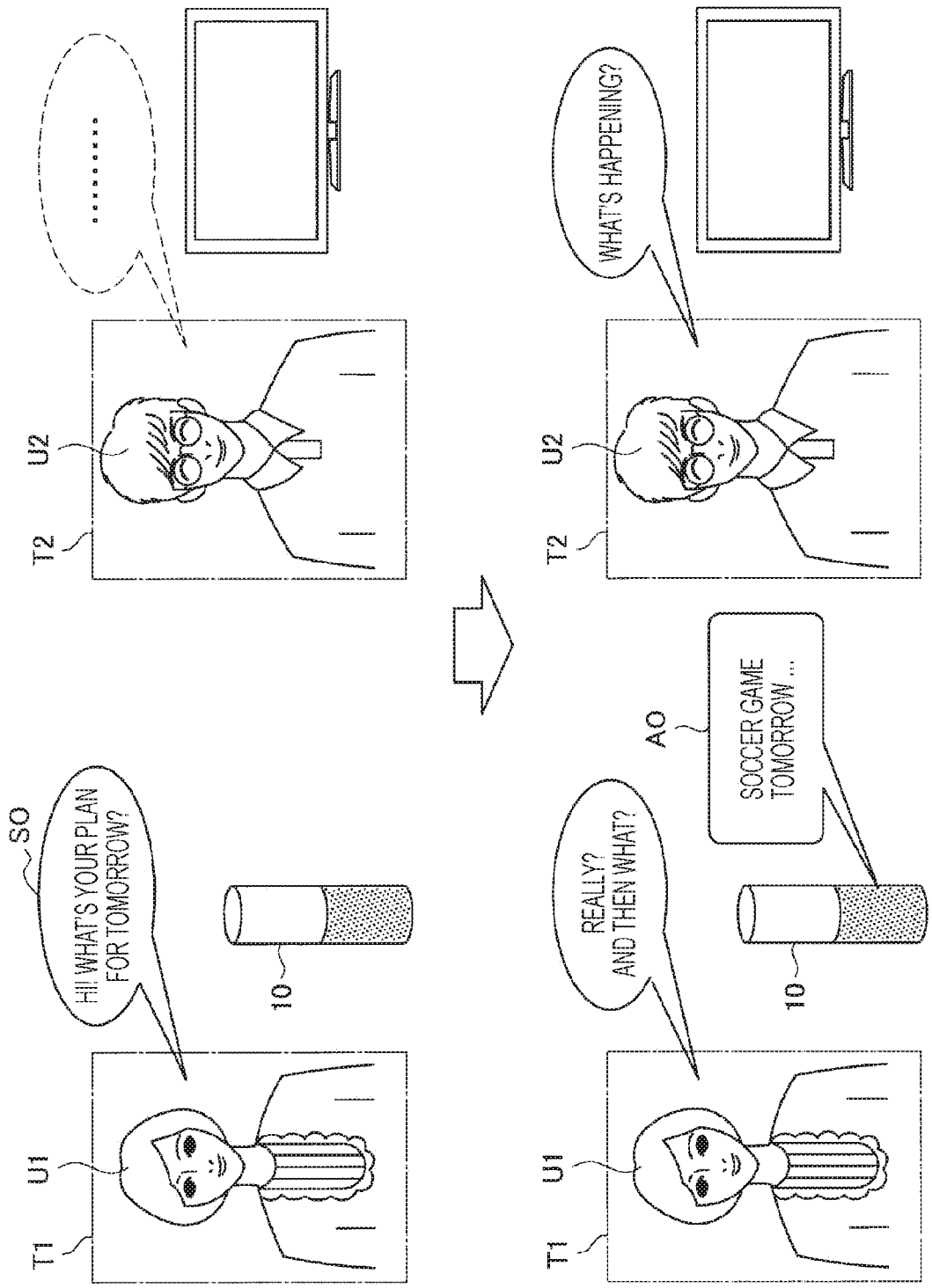
FIG. 1 is a view illustrating an overview of a technological concept common to embodiments of the present disclosure.

Preferred embodiments of the present disclosure will be described in detail below with reference to the accompanying drawings. Note that same reference numerals are assigned to constituent elements having substantially the same functional configuration, and redundant description is omitted in the present specification and the drawings.

Note that the description will be given in the following order.

1. Outline of concept of present technology
2. System configuration
2-1. Configuration example of information processing system
2.2. Functional configuration example of information processing terminal 10
2.3. Functional configuration example of external device 20
2.4. Functional configuration example of information processing server 30
3. First embodiment
3.1. Details of context analysis and target determination
3.2. Output control of attracting utterance
4. Second embodiment
4.1. Details of target determination
5. Operation flow of information processing server 30
6. Hardware configuration example
7. Summary 1. Outline of Concept of Present Technology First, an overview of technological concepts common to embodiments of the present disclosure will be described. As described above, over recent years, there have been widespread various agent devices that use voice to perform information notification, or the like, to users. Furthermore, many techniques for obtaining user's attention have been proposed in order to further effectively perform information notification by the agent device as described above.

At this time, techniques for obtaining the attention of the user are estimated to include, for example, performing utterance control using a volume corresponding to the environmental noise level, performing utterance using the tone different from the tone of ambient sound, and the like, as techniques described in Patent Document 1.

However, when the above-described technique is used, it is expected that the user's adaptation to the volume and tone would gradually reduce the effect of obtaining attention. Furthermore, in a case where, in practice, the user notices the utterance from the agent device and leaves the utterance unattended, for example, it would be difficult, with the above technique, to attract an interest from the user more than the current status.

A concept of the present technology is conceived focusing on the above points so as to make it possible to more effectively attract an interest from the target user. To achieve this, an information processing apparatus and an information processing method according to an embodiment of the present disclosure is configured to determine a target user on the basis of a context of utterance and to control an output device to output an attracting utterance for attracting an interest of the target.

FIG. 1 is a view illustrating an overview of technological concept common to embodiments of the present disclosure. FIG. 1 illustrates an information processing terminal 10 that makes an utterance to the user under the control of an information processing server 30 according to an embodiment of the present disclosure, and also illustrates users U1 and U2.

Here, for example, as illustrated in an upper part of FIG. 1, it is assumed that the user U1 makes an utterance SO corresponding to a call or a question to the user U2, and the user U2 makes no response to the utterance SO. At this time, the information processing server 30 according to an embodiment of the present disclosure determines the user U2 as a target from which interest is to be attracted on the basis of the analyzed context.

Here, in the case of the example illustrated in FIG. 1, the above-described context may be a status where the user U2 would make no response to the utterance SO of the user U1. That is, the context in the present disclosure refers to a predetermined status to trigger utterance control by the information processing server 30. The information processing server 30 can analyze the above-described context on the basis of the collected sound information, image information, or the like, and can thereby determine a target from which an interest is to be attracted.

Subsequently, the information processing server 30 controls the information processing terminal 10 to output an utterance (hereinafter, referred to as an attracting utterance) that attracts an interest of the user U2 determined as the target. That is, the information processing server 30 controls the information processing terminal 10 to output the above-described attracting utterance, making it possible, on behalf of the user U1, to attract an interest of the user U2 who would make no response to the utterance SO of the user U1.

At this time, the information processing server 30 may control the information processing terminal 10 to output the above-described attracting utterance to the user U1, as illustrated in a lower part of FIG. 1. In this manner, the information processing server 30 according to an embodiment of the present disclosure separately determines a target from which an interest is to be attracted and a target to which an attracting utterance is to be output. Hereinafter, the target to which an attracting utterance is to be output will be referred to as a first target, and the target from which an interest is to be attracted will be referred to as a second target.

In an example illustrated in the lower part of FIG. 1, the information processing server 30 controls an attracting utterance AO for attracting an interest from the user U2 being a second target T2, to be output to the user U1 as a first target T1. At this time, the information processing server 30 may include, in the attracting utterance AO, content related to matters of interest of the user U2 being the second target T2. According to the above-described utterance control by the information processing server 30, the user U2 who notices that the user U1 and the information processing terminal 10 are performing a dialogue related to the user U2's own matter of interest is expected to spontaneously make a reaction to the dialogue, making it possible to attract an interest of the second target further naturally and effectively.

In this manner, according to the information processing server 30 in an embodiment of the present disclosure, it is possible to attract an interest from the second target not noticing calls from another user or an agent device due to noise, another works, or the like, leading to acquisition of an opportunity to notify the second target of a message that another user or an agent device intended to pass.

Furthermore, the above-described utterance control by the information processing server 30 would also be effective for the second target who has left the call or the like unattended after having noticed the call or the like. For this reason, unlike the general alarm or control of volume and tone, the concept of the present technology has a more effective attracting effect by appealing to an interest of the second target.

2. System Configuration

<<2.1. Configuration Example of Information Processing System>>

Figure 2:
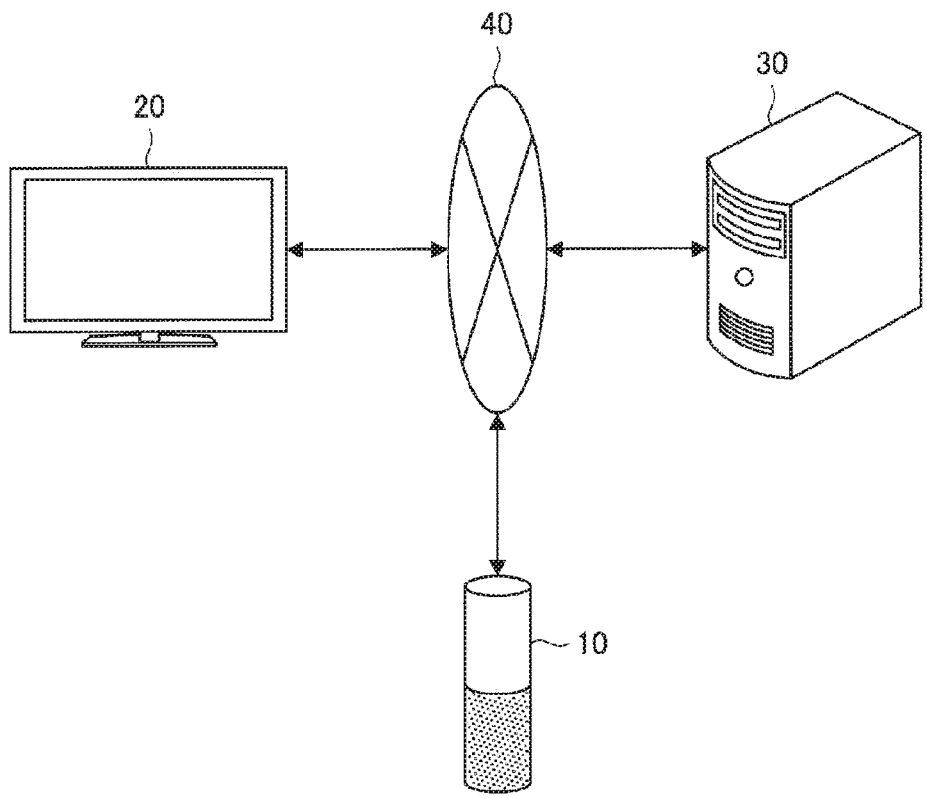
FIG. 2 is a view illustrating a configuration example of an information processing system common to the embodiments of the present disclosure.

Next, a system configuration common to the embodiments of the present disclosure will be described. First, a configuration example of an information processing system according to the embodiments of the present disclosure will be described. FIG. 2 is a view illustrating a configuration example of an information processing system common to the embodiments of the present disclosure. Referring to FIG. 2, the information processing system includes an information processing terminal 10, an external device 20, and an information processing server 30. Furthermore, connection between the information processing terminal 10 and the information processing server 30, and connection between the external device 20 and the information processing server 30 are implemented via the network 40 so as to achieve mutual communication.

(Information Processing Terminal 10)

The information processing terminal 10 is an information processing apparatus that outputs a voice utterance under the control by the information processing server 30. The information processing terminal 10 has, in particular, a function of outputting an attracting utterance on the basis of the utterance control by the information processing server 30. The information processing terminal 10 may be a dedicated device of a stationary type, a build-in type, or an autonomous mobile type. Furthermore, the information processing terminal 10 may be a general-purpose information processing apparatus such as a personal computer (PC). The information processing terminal 10 is defined as various devices having an information output function using voice.

Furthermore, the information processing terminal 10 may have a function of collecting user's utterance and surrounding sounds, and transmitting the collected utterance or sound to the information processing server 30. Furthermore, the information processing terminal 10 may capture a user's image and transmit the image to the information processing server 30. Various types of information collected by the information processing terminal 10 is usable for context analysis or target determination performed by the information processing server 30 described later.

(External Device 20)

The external device 20 is a variety of devices operated or utilized by the second target. Examples of the external device 20 may include a television device, a PC, a smartphone, an audio device, a game device, or the like. The external device 20 has a function of obtaining an operation status of the device and transmitting it to the information processing server 30. The above operation status is usable for attracting utterance output control by the information processing server 30. Furthermore, the external device 20 may collect a user's utterance, an image, or the like, and may transmit the collected information to the information processing server 30.

(Information Processing Server 30)

The information processing server 30 is an information processing apparatus that controls output of a voice utterance from the information processing terminal 10. The information processing server 30 has a function of analyzing the context on the basis of the information collected by the information processing terminal 10 and the external device 20, a function of determining the first and second targets on the basis of the context, and a function of controlling output of the attracting utterance from the information processing terminal 10.

(Network 40)

The network 40 has a function of connecting the information processing terminal 10 and the information processing server 30, connecting the external device 20 and the information processing server 30. The network 40 may include a public line network such as the Internet, a telephone network, a satellite communication network, and may include various local area networks (LANs), wide area networks (WANs), and the like, including the Ethernet (registered trademark). Furthermore, the network 40 may include a dedicated line network such as an Internet protocol-virtual private network (IP-VPN). Furthermore, the network 40 may also include a wireless communication network such as Wi-Fi (registered trademark) or Bluetooth (registered trademark).

Hereinabove, a configuration example of the information processing system common to the embodiments of the present disclosure has been described. Note that the above-described configuration described with reference to FIG. 2 is merely an example, and the configuration of the information processing system is not limited to the example. For example, the functions of the information processing terminal 10 and the information processing server 30 may be implemented by a single device. Furthermore, the functions of the information processing server 30 can be distributed to and implemented by a plurality of devices. The configuration of the information processing system according to the embodiment of the present disclosure can be flexibly modified according to the specification and the operation.

<<2.2. Functional Configuration Example of the Information Processing Terminal 10>>

Figure 3:
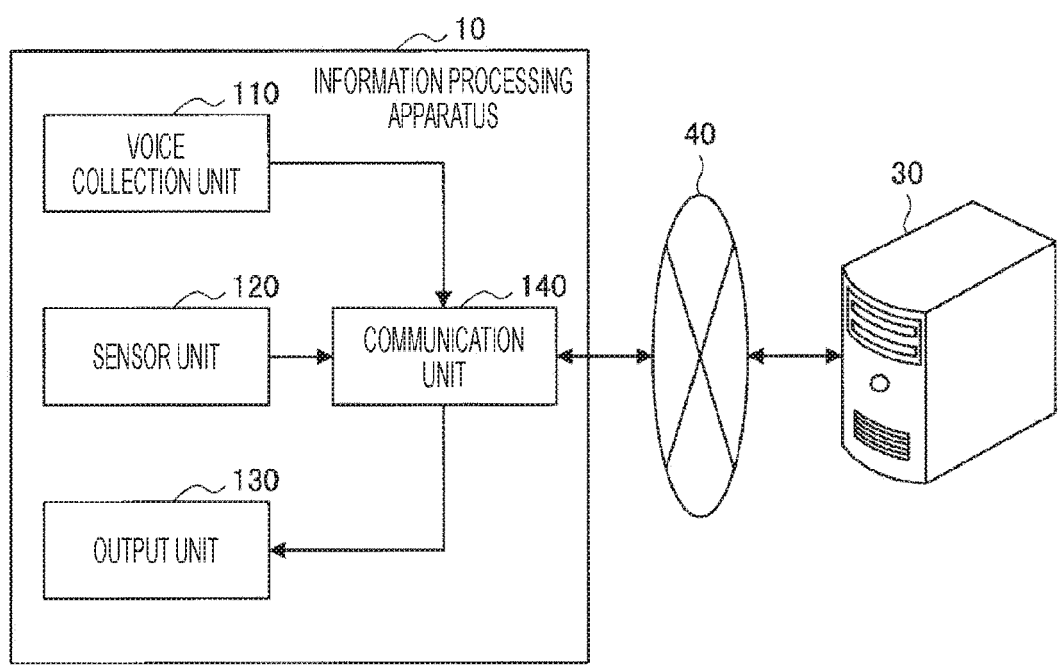
FIG. 3 is an example of a functional block diagram of an information processing terminal common to an embodiment of the present disclosure.

Next, a functional configuration example of the information processing terminal 10 common to an embodiment of the present disclosure will be described. FIG. 3 is an example of a functional block diagram of the information processing terminal 10 common to an embodiment of the present disclosure. Referring to FIG. 3, the information processing terminal 10 includes a voice collection unit 110, a sensor unit 120, an output unit 130, and a communication unit 140.

(Voice Collection Unit 110)

The voice collection unit 110 has a function of collecting the user's voice and surrounding environmental sound. The voice collection unit 110 is implemented by a microphone that converts the user's voice and environmental sound into an electrical signal, for example.

(Sensor Unit 120)

The sensor unit 120 has a function of capturing a user's image. For this purpose, the sensor unit 120 includes an imaging sensor. Furthermore, the sensor unit 120 may collect sensor information used to estimate user's location.

For this reason, the sensor unit 120 includes a human sensor or the like using an infrared or the like.

(Output Unit 130)

The output unit 130 has a function of outputting an attracting utterance under the control of the information processing server 30. At this time, the output unit 130 may perform voice output based on the artificial voice synthesized by the information processing server 30. To this end, the output unit 130 includes a speaker and an amplifier. Note that the output unit 130 may include a directional speaker such as a parametric speaker having directivity in a specific direction or range.

Furthermore, the output unit 130 may output visual information under the control of the information processing server 30. In this case, the output unit 130 includes a display device such as a liquid crystal display (LCD) device or an organic light emitting diode (OLED) device.

(Communication Unit 140)

The communication unit 140 has a function of performing information communication with the information processing server 30 via the network 40. Specifically, the communication unit 140 transmits sound information collected by the voice collection unit 110, the image information and sensor information collected by the sensor unit 120, to the information processing server 30. Furthermore, the communication unit 140 receives, from the information processing server 30, artificial voice information regarding attracting utterances and control information regarding output of the visual information.

Hereinabove, a functional configuration example of the information processing terminal 10 according to an embodiment of the present disclosure has been described. Note that the above configuration described with reference to FIG. 3 is merely an example, and the functional configuration of the information processing terminal 10 is not limited to such an example. For example, the information processing terminal 10 may further include a configuration other than the configuration illustrated in FIG. 2. The information processing terminal 10 can include an input unit that detects an input operation by a user, and the like, for example. The functional configuration of the information processing terminal 10 according to an embodiment of the present disclosure may be flexibly modified.

<<2.3. Functional Configuration Example of External Device 20>>

Figure 4:
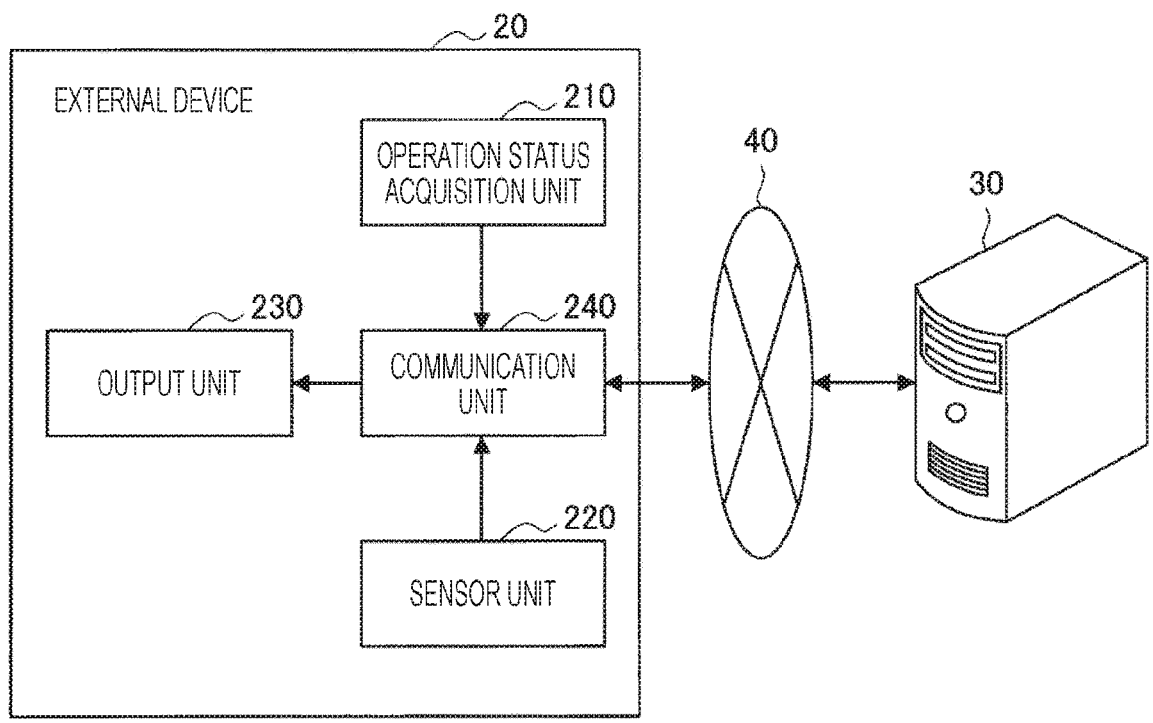
FIG. 4 is an example of a functional block diagram of an external device according to an embodiment of the present disclosure.

Next, a functional configuration example of the external device 20 according to an embodiment of the present disclosure will be described. FIG. 4 is an example of a functional block diagram of the external device 20 according to an embodiment of the present disclosure. Referring to FIG. 4, the external device 20 according to an embodiment of the present disclosure includes an operation status acquisition unit 210, a sensor unit 220, an output unit 230, and a communication unit 240.

(Operation Status Acquisition Unit 210)

The operation status acquisition unit 210 has a function of obtaining an operation status of the device. The operation status of the external device 20 obtained by the operation status acquisition unit 210 is usable for the output of the attracting utterance by the information processing server 30. For example, in a case where the external device 20 is a television device, the operation status acquisition unit 210 may obtain information regarding a broadcast program, a commercial, or the like being reproduced.

(Sensor Unit 220)

The sensor unit 220 has a function of collecting sensor information regarding user's states. The sensor unit 220 is capable of obtaining an utterance of the user, an image of the user, sensor information used for estimating the location of the user, and the like, for example. For this purpose, the sensor unit 220 includes a microphone, an imaging sensor, a human sensor, or the like.

(Output Unit 230)

The output unit 230 has a function of outputting voice information and visual information under the control of the information processing server 30. To this end, the output unit 230 includes a speaker, an amplifier, various display devices, or the like.

(Communication Unit 240)

The communication unit 240 has a function of performing information communication with the information processing server 30 via the network 40. Specifically, the communication unit 240 transmits the operation status of the external device 20 obtained by the operation status acquisition unit 210, to the information processing server 30. Furthermore, the communication unit 240 may transmit the sensor information collected by the sensor unit 220 to the information processing server 30. Furthermore, the communication unit 240 may receive, from the information processing server 30, control information related to the output of voice information and visual information.

Hereinabove, a functional configuration example of the external device 20 according to an embodiment of the present disclosure has been described. Note that the above configuration described with reference to FIG. 4 is merely an example, and the functional configuration of the external device 20 is not limited to such an example. The external device 20 according to an embodiment of the present disclosure can include various configurations corresponding to the characteristics of the external device 20 in addition to the above configurations.

<<2.4. Functional Configuration Example of the Information Processing Server 30>>

Figure 5:
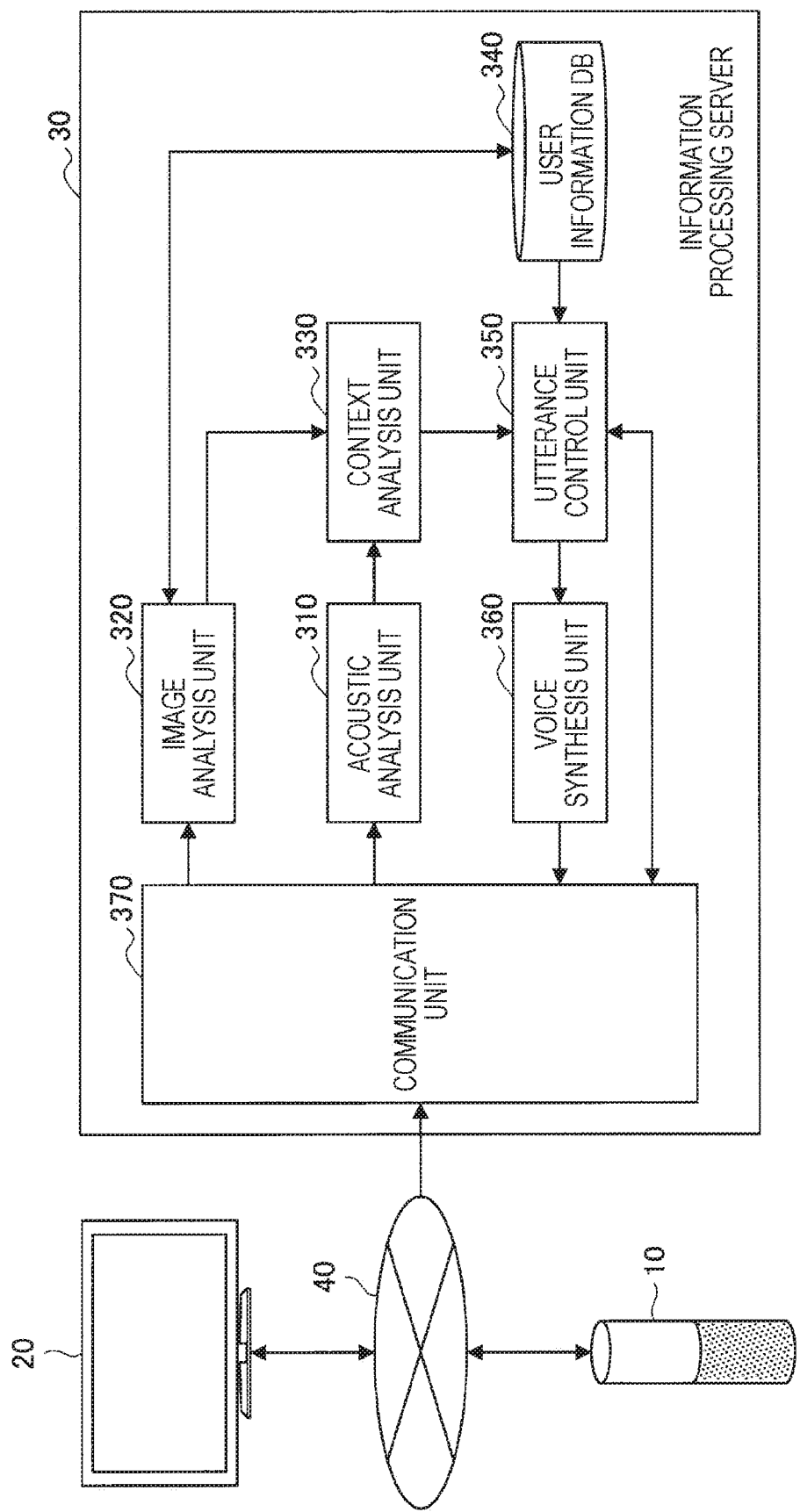
FIG. 5 is an example of a functional block diagram of an information processing server according to an embodiment of the present disclosure.

Next, a functional configuration example of the information processing server 30 according to an embodiment of the present disclosure will be described. FIG. 5 is an example of a functional block diagram of the information processing server 30 according to an embodiment of the present disclosure. Referring to FIG. 5, the information processing server 30 according to an embodiment of the present disclosure includes an acoustic analysis unit 310, an image analysis unit 320, a context analysis unit 330, a user information DB 340, an utterance control unit 350, a voice synthesis unit 360, and a communication unit 370.

(Acoustic Analysis Unit 310)

The acoustic analysis unit 310 has a function of performing acoustic analysis based on sound information transmitted from the information processing terminal 10 or the external device 20. The acoustic analysis unit 310 has a function of recognizing user's utterance on the basis of the above-described sound information, for example.

(Image Analysis Unit 320)

The image analysis unit 320 has a function of performing image analysis based on image information transmitted from the information processing terminal 10 or the external device 20. The image analysis unit 320 has a function of recognizing, for example, the user's state related to the attention, the user's location, or the like, on the basis of the above-described image information.

(Context Analysis Unit 330)

The context analysis unit 330 has a function of analyzing context related to the output control of the attracting utterance on the basis of the information analyzed by the acoustic analysis unit 310 or the image analysis unit 320. As described above, the above-described context refers to a predetermined status to trigger output control of an attracting utterance. For example, as illustrated in FIG. 1, the context analysis unit 330 may detect that another user who is the target of the utterance makes no reaction to the user's utterance.

(User Information DB 340)

The user information DB 340 is a database that stores various types of information related to the user. The user information DB 340 stores attribute information such as age, gender, and inter-user relationship, for example, in addition to the user's name and ID. The inter-user relationship may include, for example, attributes in a family such as a wife and a husband, a mother and a child, attributes in an organization such as a boss and a staff member, and the like.

Furthermore, the user information DB 340 may store matters of interest such as a user's hobby and taste, or a schedule. The above information is usable for output control of the attracting utterance by the utterance control unit 350. The user information DB 340 may further store user's image information, vocal features, and the like. The acoustic analysis unit 310 and the image analysis unit 320 can also identify the user on the basis of the above information stored in the user information DB 340.

(Utterance Control Unit 350)

The utterance control unit 350 has a function of controlling output of a voice utterance from the information processing terminal 10. At this time, the utterance control unit 350 can determine a target on the basis of the context analyzed by the context analysis unit 330, and can control the information processing terminal 10 to output an attracting utterance that attracts an interest of the target.

At this time, the utterance control unit 350 may control to determine the first target and the second target on the basis of the analyzed context, and may control the information processing terminal 10 to output the attracting utterance that attracts an interest of the second target, toward the first target.

Furthermore, the utterance control unit 350 may determine the first target and the second target on the basis of a conversation status between the users indicated by the context. For example, on the basis of a context in which a target user being a target of an utterance makes no response to the utterance of an uttering user who has made the utterance, the utterance control unit 350 may determine the uttering user as the first target and may determine the target user as the second target.

Furthermore, at this time, the utterance control unit 350 may control the information processing terminal 10 to output an attracting utterance related to the matter of interest of the second target. The utterance control unit 350 can generate content of the attracting utterance related to the above-described matter of interest on the basis of user information stored in the user information DB 340.

According to the above-described function of the utterance control unit 350 of an embodiment of the present disclosure, by achieving a dialogue about the matter of interest of the second target between the information processing terminal 10 and the first target, it would be possible to effectively attract the interest of the second target. Note that details of the function of the utterance control unit 350 will be separately described later.

(Voice Synthesis Unit 360)

The voice synthesis unit 360 has a function of generating an artificial voice related to the attracting utterance under the control of the utterance control unit 350. A population utterance generated by the voice synthesis unit 360 is transmitted to the information processing terminal 10 via the communication unit 370 and the network 40, and is output to the output unit 130 as voice.

(Communication Unit 370)

The communication unit 370 has a function of performing information communication with the information processing terminal 10 and the external device 20 via the network 40. Specifically, the communication unit 370 receives sound information, image information, and sensor information from the information processing terminal 10. The communication unit 370 further receives operation status and sensor information from the external device 20. Furthermore, the communication unit 370 transmits the artificial voice and the visual information related to the attracting utterance to the information processing terminal 10.

Hereinabove, functional configuration examples of the information processing server 30 common to the embodiments of the present disclosure have been described in detail. Note that the above configuration described using FIG. 5 is merely an example, and the functional configuration of the information processing server 30 is not limited to such an example. For example, each of functions of the information processing server 30 can be distributed to and implemented by a plurality of devices. Furthermore, as described above, the information processing server 30 may further include the function of the information processing terminal 10. In this case, the information processing server 30 can perform voice output of the attracting utterance, or the like. The functional configuration of the information processing server 30 according to an embodiment of the present disclosure may be appropriately modified according to the specification and operation.

3. First Embodiment

<<3.1. Details of Context Analysis and Target Determination>>

Subsequently, a first embodiment of the present disclosure will be described. The first embodiment of the present disclosure assumes that the information processing terminal 10 described above is used in a status where the user is limited, such as at home or at work. First, details of context analysis and target determination according to the present embodiment will be described.

As described above, the information processing server 30 according to an embodiment of the present disclosure has a function of analyzing the context on the basis of the information collected by the information processing terminal 10 and the external device 20 and then determining the first target and the second target on the basis of the context.

An example of the context analyzed by the information processing server 30 at this time includes a conversation status between users. The information processing server 30 according to the present embodiment may analyze the context related to the conversation status between users on the basis of the information collected by the information processing terminal 10 and the external device 20, and then may determine the first target and the second target on the basis of the context.

Here, the above-described conversation status includes, for example, a status in which the target user makes no response to the utterance by the uttering user as described above. The context analysis unit 330 according to the present embodiment analyzes the context as above on the basis of analysis information from the acoustic analysis unit 310 or the image analysis unit 320, enabling the utterance control unit 350 to determine the first target and the second target on the basis of the context.

FIG. 6 is a view illustrating determination of a target based on a status in which a target user makes no response to an utterance by an uttering user according to the present embodiment. An upper part of FIG. 6 illustrates a status in which a user U1 as an uttering user makes an utterance SO to a user U2 as a target user, and the user U2 makes no response to the utterance SO in a space SP1 in which the information processing terminal 10 is installed.

At this time, as illustrated in a lower part of FIG. 6, the utterance control unit 350 according to the present embodiment may determine the user U1 being the uttering user as the first target T1 and may determine the user U2 being the target user as the second target T2 on the basis of the context analyzed by the context analysis unit 330.

Subsequently, the utterance control unit 350 controls the information processing terminal 10 to output an attracting utterance AO to the user U1 as the first target T1 so as to allow the information processing terminal 10 to perform a dialogue with the user U1, making it possible to attract an interest of the user U2 being the second target T2.

Meanwhile, the conversation status according to the present embodiment may include a status where there is no conversation between users. The context analysis unit 330 according to the present embodiment can detect that there is no conversation between the users on the basis of analysis information by the acoustic analysis unit 310 or the image analysis unit 320. At this time, the utterance control unit 350 can control the information processing terminal 10 to output an attracting utterance on the basis of the above-described context analyzed by the context analysis unit 330 and thereby can facilitate conversation between the users. According to the above-described function of the utterance control unit 350 of the present embodiment, it is possible to accelerate communication between users at home, at work, or the like, so as to support building better human relationships.

At this time, the utterance control unit 350 according to the present embodiment may determine the first target as a target to which an attracting utterance is to be output, on the basis of the user position. More specifically, the utterance control unit 350 may determine the first target on the basis of a distance between the information processing terminal 10 and the user. FIG. 7 is a view illustrating determination of the first target based on the user position according to the present embodiment. An upper part of FIG. 7 illustrates a status in which there is no conversation among users U1 to U3 in the space SP1 in which the information processing terminal 10 is installed.

At this time, the utterance control unit 350 according to the present embodiment may determine the user U1 closest, in distance, to the information processing terminal 10 as the first target T1, as illustrated in the lower part of FIG. 7. The utterance control unit 350 can perform the above processing on the basis of the user position recognized by the image analysis unit 320. Subsequently, the utterance control unit 350 can control the information processing terminal 10 to output the attracting utterance AO toward the user U1 being the first target T1 so as to achieve a dialogue between the information processing terminal 10 and the user U1, making it possible to attract interest from the second target.

Note that, at this time, the utterance control unit 350 may simultaneously set a plurality of users, that is, the user U2 and the user U3 as second targets. Still, by setting a specific single user as the second target, it would be possible to more effectively attract the user's interest and accelerate conversation.

In this case, the utterance control unit 350 according to the present embodiment may determine the user closest, in distance, to the first target as the second target, for example. In this manner, the utterance control unit 350 according to the present embodiment can determine the second target on the basis of the user position.

Figure 8A:
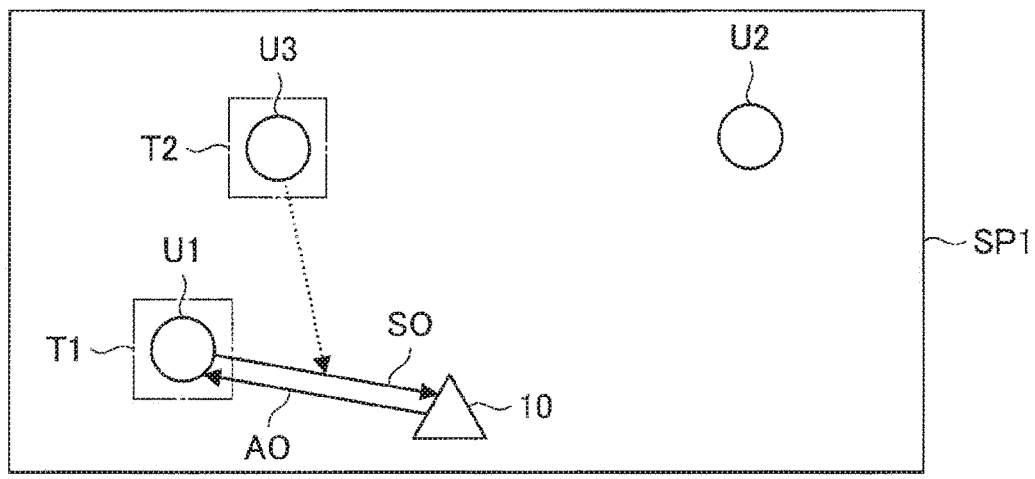
FIG. 8A is a view illustrating determination of a second target based on user position according to the same embodiment.

FIG. 8A is a view illustrating determination of the second target based on the user's position according to the present embodiment. As illustrated in the figure, the utterance control unit 350 according to the present embodiment can determine the user U3 closest, in distance, to the user U1 being the first target T1, as the second target. In this case, it is possible to expect an advantage that the closeness in distance would enhance easiness of physically attracting an interest of the second target.

Alternatively, the utterance control unit 350 according to the present embodiment can determine the second target on the basis of the user's matter of interest. For example, the utterance control unit 350 according to the present embodiment can determine a user having a matter of interest shared by the determined first target, as the second target.

Figure 8B:
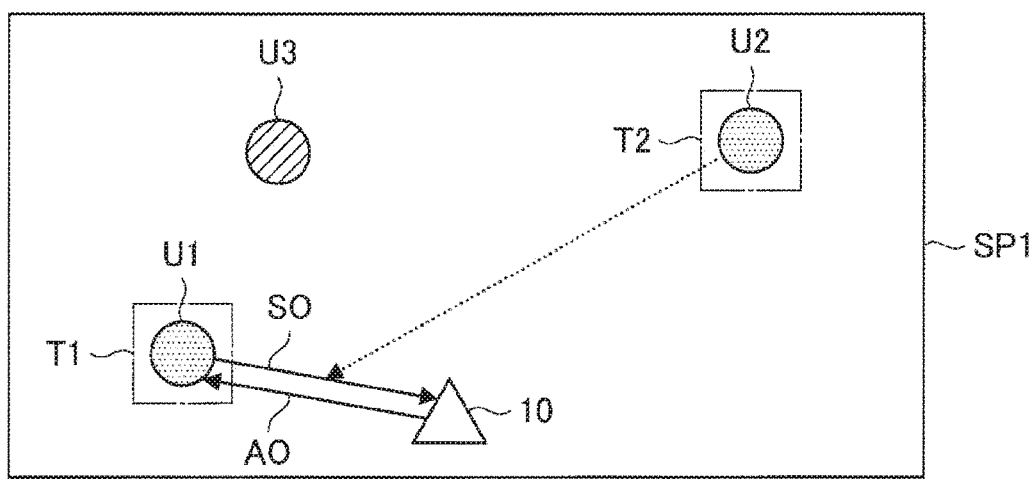
FIG. 8B is a view illustrating determination of the second target based on a matter of interest shared by targets according to the same embodiment.

FIG. 8B is a view illustrating determination of the second target based on a matter of interest shared by targets according to the present embodiment. Note that FIG. 8B illustrates the matters of interest of the individual users using different hatching types, that is, illustrating that the users U1 and U2 have a matter of interest shared by the users.

At this time, the utterance control unit 350 according to the present embodiment may search the user information DB 340 for a user having a matter of interest shared by or similar to the user U1 who is the determined first target T1, and may determine the corresponding user as the second target T2. In the example illustrated in FIG. 8B, the utterance control unit 350 determines the user U3 having a matter of interest shared by the user U1, as the second target T2.

In this case, when the utterance control unit 350 controls the information processing terminal 10 to output an causing utterance AO related to the matter of interest shared by the first target T1 and the second target T2, it is possible to expect to have an effect of effectively attracting an interest of the first target T1 and the second target T2, leading to acceleration of conversation between users.

Hereinabove, an example in which the utterance control unit 350 according to the present embodiment determines the first target on the basis of the user position and determines the second target on the basis of the first target has been described. Alternatively, the utterance control unit 350 according to the present embodiment may determine the first target on the basis of the user's matter of interest.

FIG. 9 is a view illustrating determination of the first target based on the user's matter of interest according to the present embodiment. Similar to the case illustrated in FIG. 7, an upper part of FIG. 9 illustrates a status in which there is no conversation among the users U1 to U3 in the space SP1 in which the information processing terminal 10 is installed. Here, the user U3 in FIG. 9 may be a child of the user U1 and the user U2, for example.

At this time, the utterance control unit 350 according to the present embodiment can estimate that the matter of interest of the user U1 and the user U2, as parents, is the user U3 being their child, and can determine the user U3 as the first target T1. In this case, the utterance control unit 350 can control the information processing terminal 10 to output an attracting utterance to the first target T1 (user U3) being their child, making it possible to expect an effect of attracting an interest from second targets T2a and T2b (users U1 and U2) being the child's parents, more effectively.

Furthermore, a mark attached to the user U3 in FIG. 9 indicates that the user U3 is a person whose attention is easy to be obtained. It is generally assumed that younger users are more curious and more likely to be interested in technologies such as system utterance. Therefore, the utterance control unit 350 may estimate that the matter of interest of the user U3 is technology on the basis of the user's age stored in the user information DB 340.

At this time, the utterance control unit 350 according to the present embodiment can determine the above-described user whose attention is easy to be obtained as the first target, making it possible to further reliably induce a dialogue between the information processing terminal 10 and the first target, and obtain an interest of the second target.

Note that the user U3 illustrated in FIG. 9 need not necessarily be a child as described above. The user U3 illustrated in FIG. 9 may be, for example, a pet such as a dog owned by the user U1 and the user U2. Even in a case where the user U3 is a pet, it is estimated that the user U3 is a matter of interest shared by the user U1 and the user U2, and it is assumed that the user U3 is a person whose attention is easy to be obtained. In this manner, the first target according to the present embodiment is not limited to humans, but may be an animal such as a pet or another agent device.

<<3.2. Output Control of Attracting Utterance>>

Next, output control of the attracting utterance according to the present embodiment will be described in detail. As described above, the utterance control unit 350 according to the present embodiment determines the first target and the second target on the basis of the context analyzed by the context analysis unit 330. At this time, the utterance control unit 350 according to the present embodiment may control the information processing terminal 10 to output an attracting utterance related to the matter of interest of the second target.

FIG. 10A is a view illustrating an example of an attracting utterance related to a matter of interest of the second target according to the present embodiment. In an example illustrated in FIG. 10A, the utterance control unit 350 obtains a matter of interest of the second target from the user information DB 340, and controls the information processing terminal 10 to output an attracting utterance AO including keywords KW1 and KW2 such as "soccer" and "player AB" related to the matter of interest. The utterance control unit 350 of the present embodiment controls the information processing terminal 10 and the first target to perform a dialogue related to the matter of interest of the second target so as to appeal to the curiosity of the second target, leading to attraction of an interest of the second target effectively. Furthermore, as described above, the utterance control unit 350 may control the information processing terminal 10 to output an attracting utterance related to a matter of interest shared by the first target and the second target.

Note that the utterance control unit 350 according to the present embodiment may control output of the attracting utterance based on the matter of interest estimated on the basis of various types of information, in addition to the attracting utterance based on the matter of interest of the second target stored in the user information DB 340.

For example, the utterance control unit 350 may estimate that the child is a matter of interest of the second target on the basis of family configuration of the second target stored in the user information DB 340, or the like, and may control output of the attracting utterance related to the child.

Furthermore, for example, the utterance control unit 350 may estimate a schedule to be the matter of interest of the second target on the basis of schedule information of the second target stored in the user information DB 340, or may control output of the attracting utterance including the matter related to the details of the schedule.

Furthermore, for example, the utterance control unit 350 may estimate the matter of interest from a current behavior of the second target. At this time, the utterance control unit 350 can estimate the behavior of the second target on the basis of an operation status received from the external device 20. For example, the utterance control unit 350 can obtain information about a broadcast program being viewed by the second target from the external device 20 being a television device, and can control the information processing terminal 10 to output an attracting utterance related to the content of the broadcast program.

In this manner, the utterance control unit 350 according to the present embodiment can estimate the user's matter of interest on the basis of various types of information, and can control the information processing terminal 10 to output an attracting utterance related to the matter of interest.

Furthermore, the utterance control unit 350 according to the present embodiment may attract an interest of the second target by controlling the information processing terminal 10 to output an attracting utterance including emotional expression. FIG. 10B is a view illustrating an example of an attracting utterance including emotional expression according to the present embodiment. In the example illustrated in FIG. 10B, the utterance control unit 350 controls the information processing terminal 10 to output the attracting utterance AO in which emotional expression EE1 related to surprise, interest, exclamation, or the like, is emphasized.

Such an utterance related to emotional expression is generally assumed to easily draw user's interest and attention. Therefore, the utterance control unit 350 according to the present embodiment controls the information processing terminal 10 to output the attracting utterance AO including emphasized emotional expression, laughter, or the like, thereby effectively attracting an interest of the second target. Furthermore, at this time, the utterance control unit 350 may perform control such as raising the volume selectively in the utterance related to the emotional expression, or repeating or reproducing the emotional expression indicated by the first target. Furthermore, the utterance control unit 350 may increase the frequency of the utterance turn related to the dialogue with the first target, such as reducing the length of the utterance to be output at one time, thereby warming up the dialogue to attract the interest of the second target.

Furthermore, the utterance control unit 350 according to the present embodiment may control the information processing terminal 10 to deliberately output an attracting utterance so that the attracting utterance becomes partially less audible for the second target. FIG. 10C is a view illustrating an example of attracting utterance controlled so as to be partially less audible according to the present embodiment. In the example illustrated in FIG. 10C, the utterance control unit 350 controls the information processing terminal 10 to output the attracting utterance AO in extremely low volume in part of the content.

Since the whole picture cannot be grasped with the output as described above, it is possible to attract curiosity and frustration of the second target, leading to an effect of attracting an interest of the second target. Note that while the above is an example in which the attracting utterance AO is made partially less audible by adjusting the volume, the utterance control unit 350 can achieve the effect similar to the above by introducing noise and sound effects, for example. Alternatively, for example, the utterance control unit 350 can control to make the attracting utterance partially less audible by using output sound from the external device 20. For example, the utterance control unit 350 may control the information processing terminal 10 to output an attracting utterance at a timing when the external device 20 being a television apparatus outputs a volume higher than normal so as to obtain a status in which the attracting utterance is less audible.

Figure 10D:
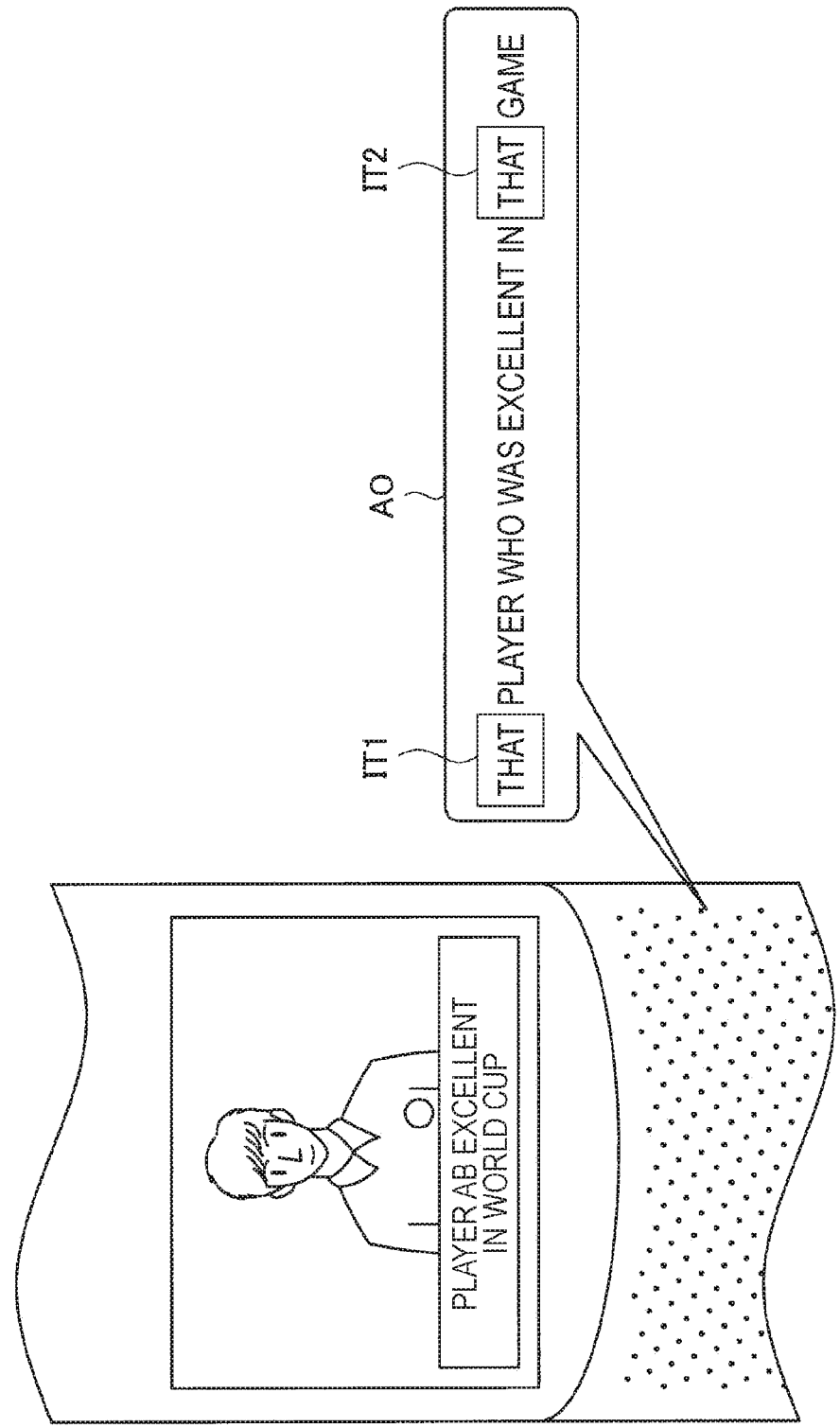
FIG. 10D is a view illustrating an example of an attracting utterance that frequently uses demonstratives according to the same embodiment.

Furthermore, the utterance control unit 350 according to the present embodiment may attract an interest of the second target by controlling the information processing terminal 10 to output an attracting utterance that frequently uses demonstratives. FIG. 10D is a view illustrating an example of an attracting utterance that frequently uses demonstratives according to the present embodiment. In the example illustrated in FIG. 10D, the utterance control unit 350 controls the information processing terminal 10 to output an attracting utterance AO deliberately using demonstratives IT1 and IT2. Since the whole picture cannot be grasped with the output like this, it is possible to attract curiosity and frustration of the second target, leading to an effect of attracting an interest of the second target.

Furthermore, at this time, the utterance control unit 350 can control a display device or the like included in the information processing terminal 10 to output visual information related to the attracting utterance AO, as illustrated in the figure. According to the above-described function of the utterance control unit 350 of the present embodiment, it is possible to clearly transmit the content of the attracting utterance AO to the first target as well as effectively attract an interest of the second target.

Hereinabove, the output control of the attracting utterance by the utterance control unit 350 according to the present embodiment has been described with specific examples. However, the output control of the attracting utterance according to the present embodiment is not limited to such an example. For example, the utterance control unit 350 according to the present embodiment can perform various types of control for attracting the second target.

For example, the utterance control unit 350 may attract the second target by controlling output of visual information from the information processing terminal 10 or the external device 20. Specifically, the utterance control unit 350 can control the information processing terminal 10 to output an attracting utterance and can control to use a projection function to output a character string or an image to the view field of the second target, thereby attracting the second target. Furthermore, the utterance control unit 350 may output a character string or an image to the display device of the external device 20 operated or used by the second target.

Furthermore, in a case of using the output of visual information as described above in combination, the utterance control unit 350 can also attract an interest of the second target by displaying an avatar of the first target or the like, for example. The above control is particularly useful in contexts where the second target has made no response to utterance of the first target. Furthermore, at this time, the utterance control unit 350 may control the above avatar or the like to present the content of the utterance of the first target. Furthermore, the utterance control unit 350 may display, in a normal state, the above avatar merely in a case where there is an important notification. This makes it possible to notify the user of occurrence of some notification in a case where the avatar is displayed.

As described above, the utterance control unit 350 according to the present embodiment can generate content of the attracting utterance that attracts the second target on the basis of various types of information, and can perform various types of output control related to the attracting utterance. According to the above-described function of the utterance control unit 350 of the present embodiment, it is possible to further effectively attract the second target, leading to acquisition of opportunity for information notification and conversation between the users.

Furthermore, the utterance control unit 350 according to the present embodiment can learn the reaction of the second target toward the attracting utterance, and can feedback the result of the learning to subsequent output control of the attracting utterance. For example, the utterance control unit 350 may perform control to lower the priority of the matter of interest used for generating the attracting utterance on the basis of a fact that the second target has made no reaction to the output attracting utterance.

Furthermore, in a case where the attracting utterance related to an identical matter of interest has been repeatedly output, the second target attracting effect is expected to gradually decrease. For this reason, the utterance control unit 350 may estimate a decreasing curve of the attracting effect related to the attracting utterance, and may use various attracting utterances properly a to maintain a predetermined level of the attracting effect. According to the above-described function of the utterance control unit 350 of the present embodiment, it is possible to continuously attract an interest of the second target for a longer period unlike the control using volume and tones.

4. Second Embodiment

<<4.1. Details of Target Determination>>

Subsequently, a second embodiment of the present disclosure will be described. The first embodiment described above is an example in which the information processing terminal 10 is used in a status where the user is limited, such as at home or at work. In contrast, the second embodiment of the present disclosure assumes a case where the information processing terminal 10 is used in a status with an unspecified number of users. The information processing terminal 10 according to the present embodiment may be a digital signage terminal installed on a street or the like, for example.

Here, details of target determination by the utterance control unit 350 according to the present embodiment will be described. The utterance control unit 350 according to the present embodiment first determines the second target on the basis of the context analyzed by the context analysis unit 330. At this time, the second target according to the present embodiment can be determined as a user having an attribute corresponding to a target layer of goods and services for sales promotion. For this reason, the context analysis unit 330 according to the present embodiment may analyze the attribute that corresponds to the context for determining the second target described above, that is, the target layer, on the basis of information obtained from the source company of the digital signage, or the like.

At this time, the utterance control unit 350 according to the present embodiment can determine the second target on the basis of the context related to the above target layer analyzed by the context analysis unit 330 and on the basis of user attributes (such as gender and age) identified by the image analysis unit 320.

Figure 11:
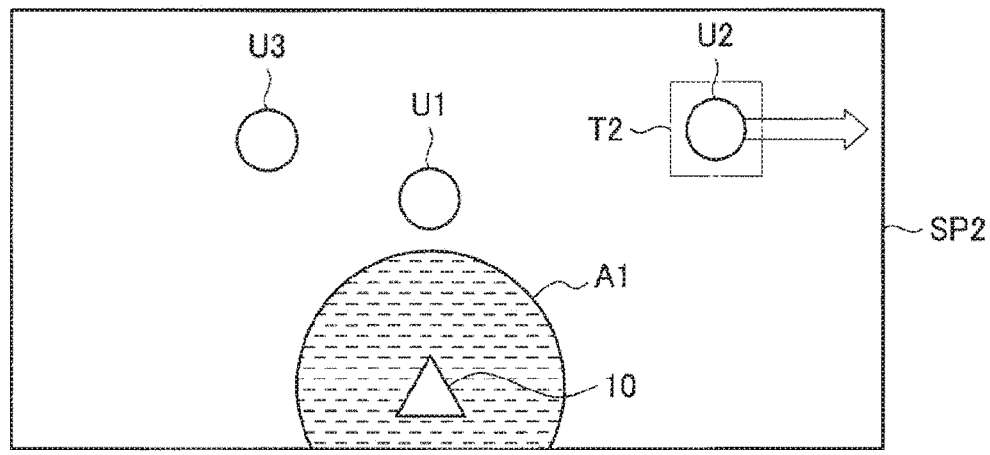
FIG. 11 is a view illustrating an example of a context to trigger output control of an attracting utterance according to a second embodiment of the present disclosure.

Furthermore, the context analysis unit 330 according to the present embodiment analyzes the context to trigger output control of the attracting utterance by the utterance control unit 350, similarly to the first embodiment. FIG. 11 is a view illustrating an example of a context to trigger output control of the attracting utterance according to the present embodiment.

FIG. 11 illustrates a status in which no user exists in a predetermined range A1 from the information processing terminal 10 in a space SP2 in which the information processing terminal 10 is installed. Furthermore, FIG. 11 illustrates a state, by an outline arrow, where the line of sight or the face of the user U2 being the second target faces in the direction different from the direction in which the information processing terminal 10 exists.

At this time, the utterance control unit 350 according to the present embodiment may determine the first target on the basis of the above-described status analyzed by the context analysis unit 330. That is, the utterance control unit 350 may determine the first target on the basis of a fact that the user's existence is not detected within the predetermined range A1 from the information processing terminal 10. Furthermore, the utterance control unit 350 may determine the first target on the basis of a fact that the attention of the second target has not been obtained. According to the above-described function of the utterance control unit 350 of the present embodiment, outputting the attracting utterance can attract the first target to the periphery of the information processing terminal 10, making it possible to effectively attract an interest of the second target corresponding to the target layer of digital signage.

Figure 12A:
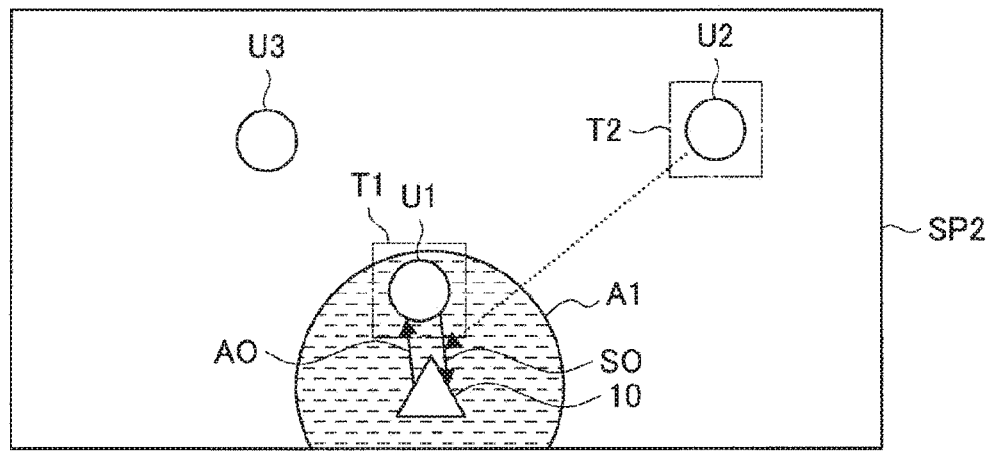
FIG. 12A is a view illustrating determination of a first target based on user position according to the same embodiment.

At this time, the utterance control unit 350 according to the present embodiment may determine the first target on the basis of the user position, for example. FIG. 12A is a view illustrating determination of the first target based on the user's position according to the present embodiment. As illustrated in FIG. 12A, in the status illustrated in FIG. 11, for example, the utterance control unit 350 may determine the user U1 closest, in distance, to the information processing terminal 10 as the first target, and may control the information processing terminal 10 to output an attracting utterance. Furthermore, for example, in the status illustrated in FIG. 11, the utterance control unit 350 may determine the user U1 having the smallest sum of the distance to the information processing terminal 10 and the distance to the user U2 being the second target, as the first target, and may control the information processing terminal 10 to output an attracting utterance.

According to the above-described control by the utterance control unit 350 of the present embodiment, by attracting the first target located near the information processing terminal 10 or near the second target to a position around the information processing terminal 10 and allowing a dialogue to be performed between them, it would be possible to allow the second target to perceive the presence of the information processing terminal 10 and to attract an interest of the second target.

Figure 12B:
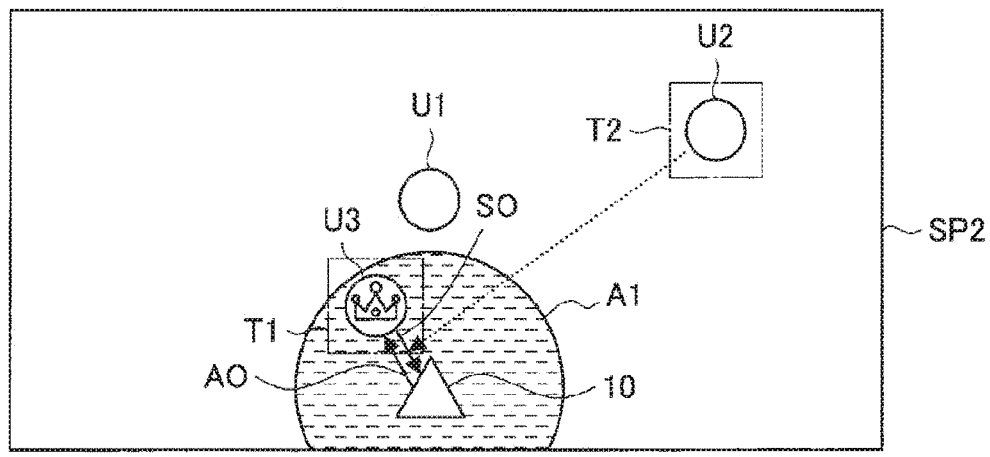
FIG. 12B is a view illustrating determination of the first target based on ease of acquisition of attention according to the same embodiment.

Furthermore, the utterance control unit 350 according to the present embodiment may alternatively determine, for example, a user whose attention is easy to be obtained, as the first target. FIG. 12B is a view illustrating determination of the first target based on ease of acquisition of attention according to the present embodiment. The mark attached to the user U3 in FIG. 12B indicates that the user U3 is a person whose attention is easy to be obtained.

Here, the ease of acquisition of attention according to the present embodiment may include both the ease of acquisition of attention by the utterance output of the information processing terminal 10 and the ease of acquisition of attention of the second target. The utterance control unit 350 may estimate that the attention of the user U3 is easy to be obtained by output of an utterance on the basis of a fact that the age of the user U3 recognized by the image analysis unit 320 is relatively young, for example, and may determine the user U3 as the first target.

Furthermore, the utterance control unit 350 may determine the user U3 as the first target on the basis of a fact that the attribute of the user U3 recognized by the image analysis unit 320 corresponds to the attribute that is likely to attract an interest of the second target. Note that, the above-described attribute that is likely to attract interest is to be an infant layer or the like, for example, in a case where the second target is an elderly layer, and is to be an opposite gender in a youth layer or the like in a case where the second target belongs to the youth layer.

In this manner, according to the utterance control unit 350 of the present embodiment, it is possible to effectively attract an interest of the second target by determining the first target on the basis of ease of acquisition of attention by the utterance output and the ease of acquisition of attention of the second target.

Note that the utterance control unit 350 according to the present embodiment may determine the first target on the basis of the matter of interest, as described in the first embodiment. At this time, the utterance control unit 350 may estimate a matter that is generally considered to be the matter of interest for an age group or the like to which the second target belongs, and may determine a user belonging to other age group presumed to be interested in the matter in a similar manner, as the first target.

In this manner, according to the utterance control unit 350 of the present embodiment, by determining the first target on the basis of various types of information and attracting the user to the periphery of the information processing terminal 10 being a digital signage terminal, it is possible to effectively attract an interest of the second target corresponding to the target layer, leading to achievement of a high advertising effect.

5. Flow of Operation of Information Processing Server 30

Figure 13:
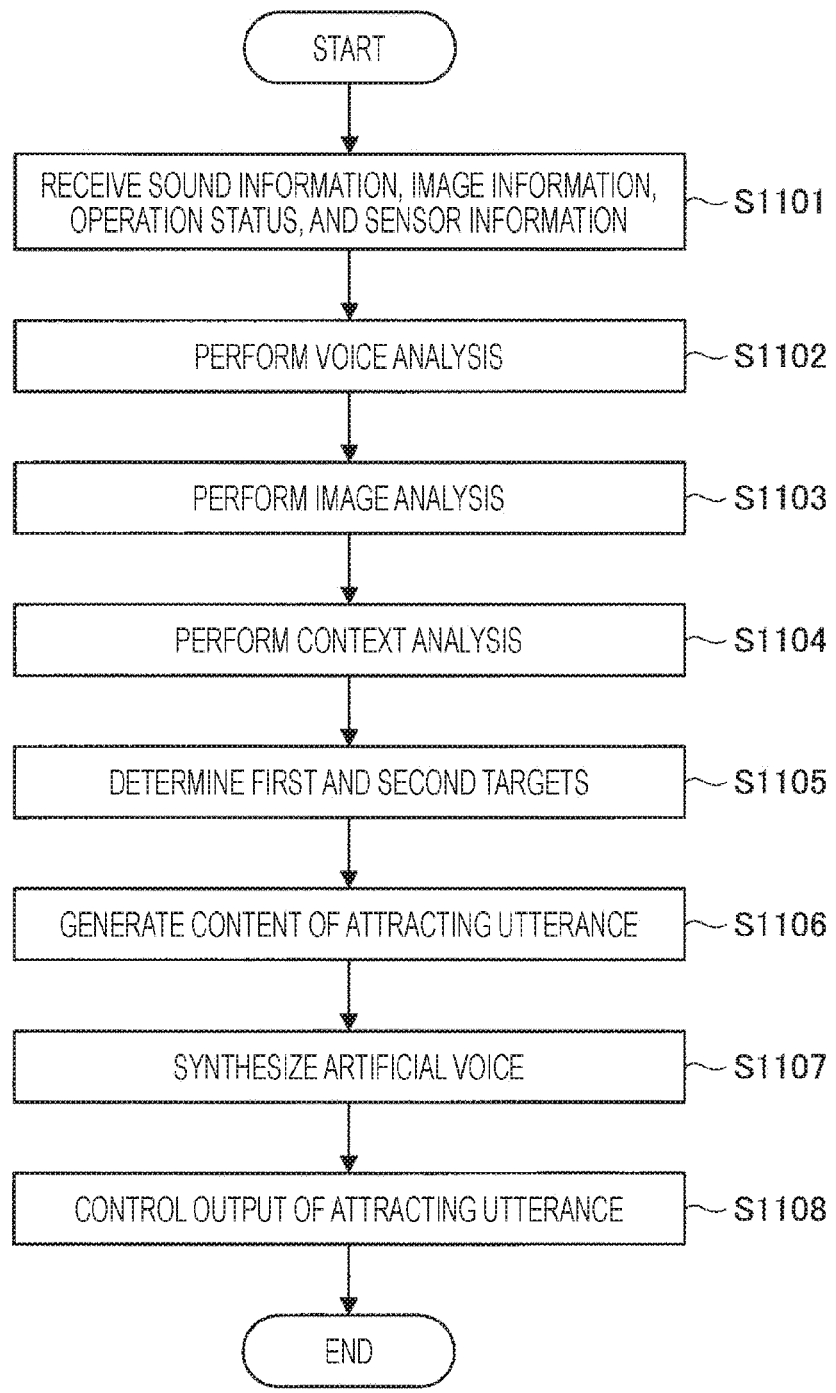
FIG. 13 is a flowchart illustrating an operation flow of an information processing server according to an embodiment of the present disclosure.

Next, a flow of operation of the information processing server 30 common to the embodiments of the present disclosure will be described. FIG. 13 is a flowchart illustrating a flow of operation of the information processing server 30 common to the embodiments of the present disclosure.

Referring to FIG. 13, first, the communication unit 370 of the information processing server 30 receives sound information, image information, an operation status, sensor information, or the like, from the information processing terminal 10 and the external device 20 (S1101).

Next, the acoustic analysis unit 310 performs acoustic analysis based on the sound information received in step S1101 (S1102). At this time, the acoustic analysis unit 310 may analyze a conversation status of the user or the like, for example.

Furthermore, the image analysis unit 320 performs image analysis based on the image information received in step S1101 (S1103). At this time, the image analysis unit 320 may determine the user and may recognize user's state and position.

Next, the context analysis unit 330 analyzes the context on the basis of the analysis results obtained in step S1102 and step S1103 (S1104).

Next, the utterance control unit 350 determines the first target and the second target on the basis of the context analyzed in step S1104 (S1105).

Subsequently, the utterance control unit 350 generates content of the attracting utterance on the basis of the information of the target determined in step S1105, the operation status received in step S1101, or the like (S1106).

Next, the voice synthesis unit 360 synthesizes an artificial voice on the basis of the content of the attracting utterance generated in step S1106 (S1107).

Next, the utterance control unit 350 controls output of the attracting utterance from the information processing terminal 10 using the artificial voice synthesized in step S1107 or the like (S1108).

6. Hardware Configuration Example

Figure 14:
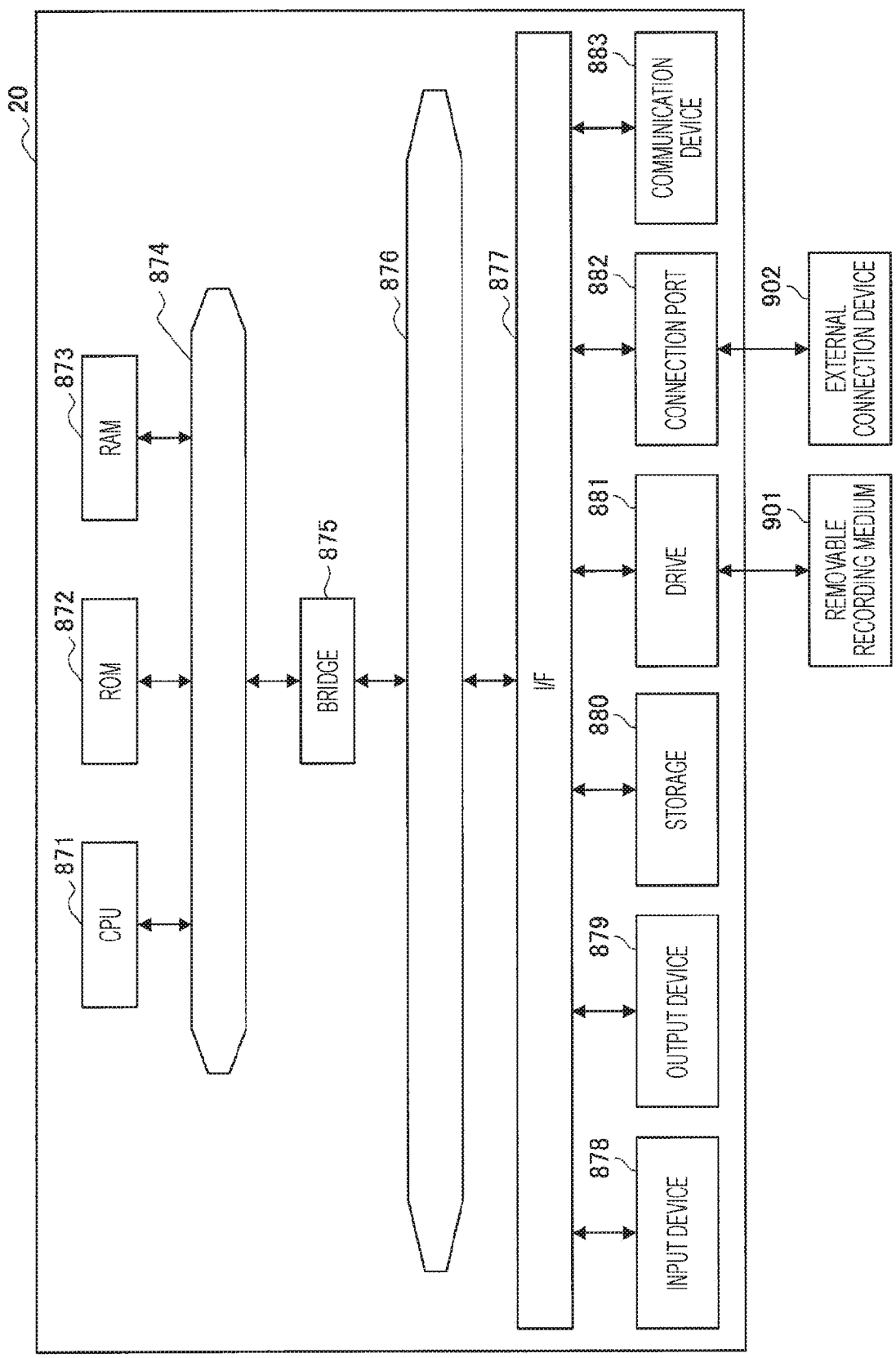
FIG. 14 is a hardware configuration example according to an embodiment of the present disclosure.

Next, a hardware configuration example common to the information processing terminal 10 and the information processing server 30 according to an embodiment of the present disclosure will be described. FIG. 14 is a block diagram illustrating a hardware configuration example of the information processing terminal 10 and the information processing server 30 according to an embodiment of the present disclosure. Referring to FIG. 14, the information processing terminal 10 and the information processing server 30 include, for example, a CPU 871, a ROM 872, a RAM 873, a host bus 874, a bridge 875, an external bus 876, an interface 877, and an input device 878, an output device 879, a storage 880, a drive 881, a connection port 882, and a communication device 883. Note that the hardware configuration illustrated here is an example, and the constituent elements may partially be omitted. Furthermore, the configuration may further include constituents other than the constituents illustrated here.

(CPU 871)

The CPU 871 functions as, for example, an arithmetic processing device or a control device, and controls part or whole of operation of each of components on the basis of various programs recorded in the ROM 872, the RAM 873, the storage 880, or the removable recording medium 901.

(ROM 872 and RAM 873)

The ROM 872 is a means that stores a program read by the CPU 871, data used for arithmetic operation, or the like. The RAM 873 temporarily or permanently stores a program read by the CPU 871, various parameters that appropriately change at execution of the program, and the like, for example.

(Host Bus 874, Bridge 875, External Bus 876, and Interface 877)

The CPU 871, the ROM 872, and the RAM 873 are mutually connected via the host bus 874 capable of high-speed data transmission, for example. Meanwhile, the host bus 874 is connected to an external bus 876 having a relatively low data transmission speed via the bridge 875, for example. Furthermore, the external bus 876 is connected to various components via the interface 877.

(Input Device 878)

Examples of the input device 878 include a mouse, a keyboard, a touch panel, buttons, a switch, a lever, or the like. Moreover, the input device 878 can be implemented by a remote controller (hereinafter referred to as a remote) capable of transmitting a control signal using infrared or other radio waves. Furthermore, the input device 878 includes a voice input device such as a microphone.

(Output Device 879)

The output device 879 is a device capable of visually or aurally notifying obtained information to the user, for example, a display device such as a cathode ray tube (CRT), an LCD, or an organic EL, an audio output device such as a speaker or a headphone, a printer, a mobile phone, a facsimile, or the like Furthermore, the output device 879 according to the present disclosure includes various vibration devices capable of outputting a tactile stimulus.

(Storage 880)

The storage 880 is a device for storing various types of data. Examples of the storage 880 include a magnetic storage device such as a hard disk drive (HDD), a semiconductor storage device, an optical storage device, a magneto-optical storage device, or the like.

(Drive 881)

The drive 881 is a device that reads out information recorded on a removable recording medium 901 such as a magnetic disk, an optical disk, a magneto-optical disk, or a semiconductor memory, or writes information to the removable recording medium 901.

(Removable Recording Medium 901)

Examples of the removable recording medium 901 include a DVD medium, a Blu-ray (registered trademark) medium, an HD DVD medium, various types of semiconductor storage media, and the like. The removable recording medium 901 may, of course, include an IC card loaded with a non-contact IC chip, an electronic device, or the like, for example.

(Connection Port 882)

The connection port 882 is a port for connecting an external connection device 902, such as a universal serial bus (USB) port, an IEEE 1394 port, a Small Computer System Interface (SCSI), an RS-232C port, or an optical audio terminal, for example.

(External Connection Device 902)

Examples of the external connection device 902 include a printer, a portable music player, a digital camera, a digital video camera, an IC recorder, or the like.

(Communication Device 883)

The communication device 883 is a communication device for connecting to a network, and examples of this include: a communication card for wired or wireless LAN, Bluetooth (registered trademark) or wireless USB (WUSB); a router for optical communication, asymmetric digital subscriber line (ADSL) router; modem for various types of communication, or the like.

7. Summary

As described above, the information processing server 30 according to an embodiment of the present disclosure analyzes a context to trigger utterance control, and determines the target on the basis of the context. Furthermore, the information processing server 30 according to an embodiment of the present disclosure controls the information processing terminal 10 to output an attracting utterance for attracting an interest of the above-described target. According to such a configuration, it is possible to achieve voice utterance that can attract an interest of the target further effectively.

Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

Furthermore, individual steps associated with the processing of the information processing server 30 in the present specification do not necessarily have to be processed chronologically in the order described in the flowchart. For example, individual steps associated with the processing of the information processing server 30 may be processed in an order different from the order described in the flowchart or may be processed in parallel.

Furthermore, the effects described in this specification are merely illustrative or exemplary, and are not limiting. That is, the technology according to the present disclosure can exhibit other effects obvious to those skilled in the art from the description of the present specification together with the above effects or in place of the above effects.

Note that the following configuration should also be within the technical scope of the present disclosure.

(1)

An information processing apparatus including an utterance control unit that controls output of voice utterance, in which the utterance control unit determines a target on the basis of an analyzed context, and controls an output device to output an attracting utterance that attracts an interest of the target.

(2)

The information processing apparatus according to (1), in which the utterance control unit determines a first target and a second target on the basis of the context, and controls the output device to output the attracting utterance toward the first target.

(3)

The information processing apparatus according to (2), in which the utterance control unit controls the output device to output the attracting utterance that attracts an interest of the second target, toward the first target.

(4)

The information processing apparatus according to (2) or (3), in which the context includes a conversation status between users, and the utterance control unit determines the first target and the second target on the basis of the conversation status.

(5)

The information processing apparatus according to (4), in which, on the basis of a fact that a target user being a target of an utterance makes no response to the utterance of an uttering user who has made the utterance, the utterance control unit determines the uttering user as the first target and determines the target user as the second target.

(6)

The information processing apparatus according to (4) or (5), in which the utterance control unit determines the first target and the second target on the basis of absence of conversation between the users.

(7)

The information processing apparatus according to (2) or (3), in which the utterance control unit determines the first target on the basis of a fact that the user's existence is not detected within a predetermined range from the output device.

(8)

The information processing apparatus according to any of (2), 3, or 7, in which the utterance control unit determines the first target on the basis of a fact that attention of the second target has not been obtained.

(9)

The information processing apparatus according to any of (2) to (6), in which the utterance control unit determines the first target on the basis of the context, and determines the second target on the basis of the first target.

(10)

The information processing apparatus according to any of (2) to (8), in which the utterance control unit determines the second target on the basis of the context, and determines the first target on the basis of the second target.

(11)

The information processing apparatus according to any of (2) to (4) or any of (6) to (10), in which the utterance control unit determines one of the first target or the second target on the basis of a user position.

(12)

The information processing apparatus according to any of (2) to (4) or any of (6) to (11), in which the utterance control unit determines one of the first target or the second target on the basis of a matter of interest of the user.

(13)

The information processing apparatus according to any of (2) to (12), in which the utterance control unit controls the output device to output the attracting utterance related to the matter of interest of the second target.

(14)

The information processing apparatus according to any of (2) to (13), in which the utterance control unit controls the output device to output the attracting utterance related to the matter of interest shared by the first target and the second target.

(15)

The information processing apparatus according to any of (2) to (13), in which the utterance control unit controls the output device to output the attracting utterance included in emotional expression.

(16)

The information processing apparatus according to any of (2) to (15), in which the utterance control unit controls output of the attracting utterance from the output device such that the attracting utterance becomes partially less audible for the second target.

(17)

The information processing apparatus according to any of (1) to (16), in which the utterance control unit controls the output device to output the attracting utterance that frequently uses demonstratives.

(18)

The information processing apparatus according to any of (1) to (17), further including a context analysis unit that analyzes the context.

(19)

The information processing apparatus according to any of (1) to (18), further including an output unit that outputs the attracting utterance.

(20)

An information processing method including executing, by a processor, output control of voice utterance, in which the execution of the output control further includes:

determining a target on the basis of an analyzed context; and controlling an output device to output an attracting utterance that attracts an interest of the target.

REFERENCE SIGNS LIST

10 Information processing terminal
110 Voice collection unit
120 Sensor unit
130 Output unit
140 Communication unit
External device
210 Operation status acquisition unit
220 Sensor unit
230 Output unit
240 Communication unit
Information processing server
310 Acoustic analysis unit
320 Image analysis unit
330 Context analysis unit
340 User information DB
350 Utterance control unit
360 Voice synthesis unit
370 Communication unit

The invention claimed is:

1. An information processing apparatus comprising:
an output device; and
a processor configured to:
determine a first target and a second target on a basis of an analyzed context, wherein the analyzed context includes a conversation status between the first target and the second target, and wherein the first target and the second target are determined based on the conversation status; and
control the output device to output an attracting utterance towards the determined first target, wherein the attracting utterance is a voice utterance and attracts an interest of the determined second target.

2. The information processing apparatus according to claim 1,
wherein the processor is further configured to determine a first user who makes an utterance as the first target and a second user as the second target on a basis of a fact that the second user makes no response to the utterance made by the first user, and wherein the first user makes the utterance to the second user.

3. The information processing apparatus according to claim 1,
wherein the processor is further configured to determine the first target and the second target on a basis of absence of conversation between the first target and the second target, and wherein the absence of conversation is indicated by the conversation status.

4. The information processing apparatus according to claim 1,
wherein the processor is further configured to determine the first target on a basis of a fact that an existence of a user is not detected within a predetermined range from the output device.

5. The information processing apparatus according to claim 1,
wherein the processor is further configured to determine the first target on a basis of a fact that attention of the second target has not been obtained.

6. The information processing apparatus according to claim 1,
wherein the processor is further configured to determine the first target on a basis of the analyzed context, and determine the second target on a basis of the first target.

7. The information processing apparatus according to claim 1,
wherein the processor is further configured to determine the second target on a basis of the analyzed context, and determine the first target on a basis of the second target.

8. The information processing apparatus according to claim 1,
wherein the processor is further configured to determine one of the first target or the second target on a basis of a user position.

9. The information processing apparatus according to claim 1,
wherein the processor is further configured to determine one of the first target or the second target on a basis of a matter of interest of a user.

10. The information processing apparatus according to claim 1,
wherein the attracting utterance is related to a matter of interest of the second target.

11. The information processing apparatus according to claim 1,
wherein the attracting utterance is related to a matter of interest shared by the first target and the second target.

12. The information processing apparatus according to claim 1,
wherein the attracting utterance is included in emotional expression.

13. The information processing apparatus according to claim 1,
wherein the processor is further configured to control output of the attracting utterance by the output device such that a part of a content of the attracting utterance becomes less audible for the second target.

14. The information processing apparatus according to claim 1,
wherein the attracting utterance frequently uses demonstratives.

15. The information processing apparatus according to claim 1,
wherein the processor is further configured to analyze the context.

16. The information processing apparatus according to claim 1,
wherein the output device includes a speaker or a headphone that outputs the attracting utterance.

17. An information processing method comprising:
determining, by a processor, a first target and a second target on a basis of an analyzed context, wherein the analyzed context includes a conversation status between the first target and the second target, and wherein the first target and the second target are determined based on the conversation status; and controlling, by the processor, an output device to output an attracting utterance towards the first target, wherein the attracting utterance is a voice utterance and attracts an interest of the second target.

18. An information processing apparatus comprising:

an output device; and a processor configured to:

determine a target based on an analyzed context; and control the output device to output an attracting utterance that attracts an interest of the determined target, wherein the attracting utterance frequently uses demonstratives.

19. The information processing apparatus according to claim 18, wherein the processor is further configured to control output of the attracting utterance by the output device such that a part of a content of the attracting utterance becomes less audible for the second target.

20. The information processing apparatus according to claim 18, wherein the attracting utterance is related to a matter of interest of the determined target.

* * * * *